(12) United States Patent
Cureington et al.

(10) Patent No.: US 10,595,619 B2
(45) Date of Patent: Mar. 24, 2020

(54) MAGNETIC MULTIPURPOSE WEARABLE RETAINER

(71) Applicants: James Anthony Cureington, Cedar Park, TX (US); Judy Marie Cureington, Cedar Park, TX (US); Nicole Marie Cureington, Cedar Park, TX (US)

(72) Inventors: James Anthony Cureington, Cedar Park, TX (US); Judy Marie Cureington, Cedar Park, TX (US); Nicole Marie Cureington, Cedar Park, TX (US)

(*) Notice: Subject to any disclaimer, the term of this patent is extended or adjusted under 35 U.S.C. 154(b) by 299 days.

(21) Appl. No.: 15/356,631

(22) Filed: Nov. 20, 2016

(65) Prior Publication Data
US 2017/0238684 A1 Aug. 24, 2017

Related U.S. Application Data

(60) Provisional application No. 62/297,847, filed on Feb. 20, 2016.

(51) Int. Cl.
*A45F 5/02* (2006.01)
*A45C 13/00* (2006.01)
(Continued)

(52) U.S. Cl.
CPC .............. *A45F 5/02* (2013.01); *A45C 13/001* (2013.01); *A45C 13/1069* (2013.01);
(Continued)

(58) Field of Classification Search
CPC .... A45F 5/02; A45F 2200/0541; A45C 13/40; A45C 2013/306; A45C 13/001;
(Continued)

(56) References Cited

U.S. PATENT DOCUMENTS 3,956,795 A 5/1976 Kosakai
4,157,166 A 6/1979 Voelker
(Continued)

*Primary Examiner* — Justin M Larson
*Assistant Examiner* — Matthew T Theis
(74) *Attorney, Agent, or Firm* — Craige Thompson; Thompson Patent Law

(57) ABSTRACT

The field of invention relates to wearable retainers, and more particularly pertains to a new and improved eyewear retainer apparatus (100) wherein the same permits securement of ornamental indicia such as hatpins (110), lapel pins, trading pins and the like thereto. The magnetic multipurpose wearable retainer (100) has a cylindrical cavity (240) configured to releasably retain the nail portion (315) of said ornamental indicia. Said wearable retainer (100) attaches to shirts (900), hats (1200), jackets (1000), and other articles of clothing and accessories (1100). A hoop constructed of a length of fishing wire (120) is attached thereto said wearable retainer (100) for releasably securing eyewear (125). An earpiece (135) of said eyewear (125) is hooked through said hoop (120) until said eyewear lug (140) rests on said hoop (120), thus suspending said eyewear (125) therefrom. The embodiments disclosed herein retain ornamental nail bearing type indicia while keeping eyewear (125) and other items releasably attached thereto within easy reach.

1 Claim, 18 Drawing Sheets

(51) Int. Cl.
  *A45C 13/10* (2006.01)
  *A45C 13/40* (2006.01)
  *A45C 13/30* (2006.01)

(52) U.S. Cl.
  CPC ........ *A45C 13/40* (2013.01); *A45C 2013/306* (2013.01); *A45F 2200/0541* (2013.01)

(58) Field of Classification Search
  CPC .. A45C 13/1069; A44B 1/04; A44D 2203/00; Y10T 24/367; Y10T 24/3672; Y10T 24/32
  USPC .............. 224/183; 24/3.3, 303, 3.4; 351/155
  See application file for complete search history.

(56) References Cited

U.S. PATENT DOCUMENTS

| | | |
|---|---|---|
| 4,458,384 A | 7/1984 | Arnold |
| 4,771,515 A | 9/1988 | Guarro |
| 4,809,406 A | 3/1989 | Tsai |
| 4,894,887 A | 1/1990 | Ward, II |
| 4,949,432 A | 8/1990 | Wisniewski |
| 5,033,612 A | 7/1991 | Bibins |
| 5,078,484 A | 1/1992 | Vaughn |
| 5,319,838 A | 1/1994 | Eppenauer |
| 5,282,616 A * | 2/1994 | Stacavich-Notaro .... A44C 1/00 473/406 |
| 5,343,599 A | 9/1994 | Reeves |
| 5,551,126 A | 9/1996 | Wallo |
| 5,647,099 A | 7/1997 | Cohen |
| 5,699,140 A | 12/1997 | Fuhrman |
| 5,732,451 A | 3/1998 | Mars |
| 5,839,708 A | 11/1998 | Seach |
| 5,842,613 A | 12/1998 | White |
| 5,845,369 A | 12/1998 | Dunchock |
| 5,860,191 A | 1/1999 | Sieger |
| 5,864,924 A | 2/1999 | Rodriguez |
| 5,941,487 A | 8/1999 | Keely |
| 5,956,812 A | 11/1999 | Moennig |
| 6,076,925 A | 6/2000 | Kraut |
| 6,135,409 A | 10/2000 | O'Keeffe |
| 6,168,273 B1 | 1/2001 | Dupraz et al. |
| 6,260,749 B1 | 7/2001 | Horovitz |
| 6,282,760 B1 | 9/2001 | Mars |
| 6,330,962 B1 | 12/2001 | Rodriguez |
| 6,367,126 B1 | 4/2002 | Rivkin |
| 6,533,414 B2 | 3/2003 | Newler |
| 6,539,587 B2 | 4/2003 | Harrison |
| D487,344 S | 3/2004 | Sieger |
| D533,102 S | 12/2006 | Zoullas |
| 7,229,172 B2 | 6/2007 | Presswood, Jr. et al. |
| 7,303,276 B2 | 12/2007 | Raymond |
| 7,487,574 B2 | 2/2009 | Lee-Holowka et al. |
| 7,496,991 B2 | 3/2009 | Avery |
| 7,503,101 B2 | 3/2009 | Sieger |
| 7,553,018 B1 | 6/2009 | Riazi |
| 7,562,977 B1 | 7/2009 | Heaton |
| 7,584,527 B2 | 9/2009 | Jones |
| 7,721,392 B2 | 5/2010 | Avery |
| 7,850,302 B1 | 12/2010 | Riazi |
| 7,979,963 B2 | 7/2011 | Lee-Holowka et al. |
| 8,166,689 B1 * | 5/2012 | Emshoff ................ A47G 33/08 206/476 |
| 8,321,997 B2 | 12/2012 | Lee-Holowka et al. |
| 8,469,511 B2 | 6/2013 | Miller |
| 8,615,853 B2 | 12/2013 | Rathbun |
| 8,696,112 B1 | 4/2014 | Vaught |
| 8,739,368 B2 | 6/2014 | Murphy, Jr. |
| 8,752,743 B2 | 6/2014 | Nazarenko et al. |
| 9,144,271 B2 | 9/2015 | Tribelhorn |
| 2002/0170147 A1 | 11/2002 | Heller |
| 2003/0131449 A1 | 7/2003 | McCormack |
| 2004/0200040 A1 | 10/2004 | Frassanito |
| 2004/0237262 A1 | 12/2004 | Amone |
| 2005/0241115 A1 | 11/2005 | Aoullas |
| 2005/0248721 A1 * | 11/2005 | Sieger ................... G02C 11/02 351/157 |
| 2006/0272076 A1 * | 12/2006 | Schroeder ................ A41F 5/00 2/336 |
| 2007/0062011 A1 | 3/2007 | Avery |
| 2008/0010782 A1 | 1/2008 | Sturdy |
| 2008/0127460 A1 | 6/2008 | Severen et al. |
| 2008/0148528 A1 | 6/2008 | Jones |
| 2009/0007388 A1 | 1/2009 | Villeneuve |
| 2009/0019671 A1 | 1/2009 | Trullas |
| 2010/0000054 A1 * | 1/2010 | Roser ................ H04R 1/1091 24/3.12 |
| 2010/0039610 A1 | 2/2010 | Mauro |
| 2010/0083699 A1 | 4/2010 | Conigliaro |
| 2010/0107690 A1 | 5/2010 | Purvis et al. |
| 2010/0263170 A1 | 10/2010 | Dollar, Sr. |
| 2011/0056437 A1 * | 3/2011 | Sprung ................ A01K 63/006 119/51.04 |
| 2011/0277276 A1 | 11/2011 | Pucci |
| 2012/0118923 A1 | 5/2012 | Allen |
| 2014/0022504 A1 | 1/2014 | Peterson |
| 2014/0043582 A1 | 2/2014 | Paydar |
| 2014/0215763 A1 | 8/2014 | White |
| 2014/0237796 A1 * | 8/2014 | Durocher ................ A45F 5/02 29/428 |
| 2015/0234201 A1 | 10/2015 | Levesque |

\* cited by examiner

MAGNETIC MULTIPURPOSE WEARABLE RETAINER

CROSS REFERENCE TO RELATED APPLICATIONS

This application claims benefit of and priority to U.S. Provisional Application No. 62/297,847 filed Feb. 20, 2016 and entitled "MAGNETIC MULTIPURPOSE WEARABLE RETAINER," and which is incorporated by reference herein.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

FIELD OF THE INVENTION

The present disclosure pertains in general to magnetic wearable retainer devices and systems, more particularly to an eyeglass retaining apparatus, and, more specifically, to an eyeglass retainer having means for removably and interchangeably attaching a hatpin, lapel pin, and the like thereto for retaining.

BACKGROUND OF THE INVENTION

Millions of people in the world today wear eyeglasses for such things as correcting vision deficiencies, reducing the intensity of light, and eye protection. According to the Vision Council of America, approximately sixty-four percent (64%) of adults wear glasses for vision correction, while about eighty-five percent (85%) of the American population wear sunglasses. Most eyewear users frequently need to remove their eyewear while keeping it close at hand so as to be readily available when needed. Eyeglass cases are commonly available for safe storage, as are eyeglass chains and cords which hold the eyeglasses around the persons neck when not in-use. However these methods may be frumpy, difficult to employ, vulnerable to loss, and even hazardous in some circumstances. People dressed in casual clothes are often reluctant to carry eyewear cases, and many deem the cases a burden to keep track of. While eyewear cords are fully capable of retaining the eyewear when not in-use, many prefer not to use them for aesthetic reasons. In addition, chains and cords can present a strangulation hazard in some environments. The present disclosure addresses many concerns including those related to the visual aesthetics of the eyewear holder itself, and provides for an aesthetically pleasing eyewear holder that can appear as an ornamental feature blending in with, and even complementing, the persons attire.

The following is a tabulation of a variety of existing methods for securing items, such as eyewear, about oneself:

| U.S. Patents | | | |
|---|---|---|---|
| Pat. No. | Kind Code | Issue Date | Patentee |
| 3,956,795 | A | May 18, 1976 | Kosakai |
| 4,157,166 | A | Jun. 5, 1979 | Voelker |
| 4,458,384 | A | Jul. 10, 1984 | Arnold |
| 4,771,515 | A | Sep. 20, 1988 | Guarro |
| 4,809,406 | A | Mar. 7, 1989 | Tsai |
| 4,894,887 | A | Jan. 23, 1990 | Ward, II |
| 4,949,432 | A | Aug. 21, 1990 | Wisniewski |
| 5,033,612 | A | Jul. 23, 1991 | Bibins |
| 5,078,484 | A | Jan. 7, 1992 | Vaughn |
| 5,319,838 | A | Jan. 14, 1994 | Eppenauer |
| 5,343,599 | A | Sep. 6, 1994 | Reeves |
| 5,551,126 | A | Sep. 3, 1996 | Wallo |
| 5,647,099 | A | Jul. 15, 1997 | Cohen |
| 5,699,140 | A | Dec. 16, 1997 | Fuhrman |
| 5,732,451 | A | Mar. 31, 1998 | Mars |
| 5,839,708 | A | Nov. 24, 1998 | Seach |
| 5,842,613 | A | Dec. 1, 1998 | White |
| 5,845,369 | A | Dec. 8, 1998 | Dunchock |
| 5,860,191 | A | Jan. 19, 1999 | Sieger |
| 5,864,924 | A | Feb. 2, 1999 | Rodriguez |
| 5,941,487 | A | Aug. 24, 1999 | Keely |
| 5,956,812 | A | Sep. 28, 1999 | Moennig |
| 6,076,925 | A | Jun. 20, 2000 | Kraut |
| 6,135,409 | A | Oct. 24, 2000 | O'Keeffe |
| 6,168,273 | B1 | Jan. 2, 2001 | Dupraz et al. |
| 6,260,749 | B1 | Jul. 17, 2001 | Horovitz |
| 6,330,962 | B1 | Dec. 18, 2001 | Rodriguez |
| 6,367,126 | B1 | Apr. 9, 2002 | Rivkin |
| 6,533,414 | B2 | Mar. 18, 2003 | Newler |
| 6,539,587 | B2 | Apr. 1, 2003 | Harrison |
| D487344 | S1 | Mar. 9, 2004 | Sieger |
| D533102 | S1 | Dec. 5, 2006 | Zoullas |
| 7,229,172 | B2 | Jun. 12, 2007 | Presswood, Jr et al.. |
| 7,303,276 | B2 | Dec. 4, 2007 | Raymond |
| 7,487,574 | B2 | Feb. 10, 2009 | Lee-Holowka et al. |
| 7,496,991 | B2 | Mar. 3, 2009 | Avery |
| 7,503,101 | B2 | Mar. 17, 2009 | Sieger |
| 7,553,018 | B1 | Jun. 30, 2009 | Riazi |
| 7,562,977 | B1 | Jul. 21, 2009 | Heaton |
| 7,584,527 | B2 | Sep. 8, 2009 | Jones |
| 7,721,392 | B2 | May 25, 2010 | Avery |
| 7,850,302 | B1 | Dec. 14, 2010 | Riazi |
| 7,979,963 | B2 | Jul. 19, 2011 | Lee-Holowka et al. |
| 8,321,997 | B2 | Dec. 4, 2012 | Lee-Holowka et al. |
| 8,615,853 | B2 | Dec. 31, 2013 | Rathbun |
| 8,696,112 | B1 | Apr. 15, 2014 | Vaught |
| 8,739,368 | B2 | Jun. 3, 2014 | Murphy, Jr. |
| 8,752,743 | B2 | Jun. 17, 2014 | Nazarenko et al. |

| U.S. Patent Application Publications | | | |
|---|---|---|---|
| Pat. No. | Kind Code | Issue Date | Patentee |
| 20020170147 | A1 | Nov. 21, 2002 | Heller |
| 20030131449 | A1 | Jul. 17, 2003 | McCormack |
| 20040200040 | A1 | Oct. 14, 2004 | Frassanito |
| 20040237262 | A1 | Dec. 2, 2004 | Arnone |
| 20050241115 | A1 | Nov. 3, 2005 | Aoullas |
| 20070062011 | A1 | Mar. 22, 2007 | Avery |
| 20080127460 | A1 | Jun. 5, 2008 | Severen et al. |
| 20080148528 | A1 | Jun. 26, 2008 | Jones |
| 20090007388 | A1 | Jan. 8, 2009 | Villeneuve |
| 20090019671 | A1 | Jan. 22, 2009 | Trullas |
| 20100107690 | A1 | May 6, 2010 | Purvis et al. |
| 20100263170 | A1 | Oct. 21, 2010 | Dollar, SR. |
| 20140237262 | A1 | Aug. 28, 2014 | Durocher |
| 20120118923 | A1 | May 17, 2012 | Allen |
| 20140022504 | A1 | Jan. 23, 2014 | Peterson |
| 20140043582 | A1 | Feb. 13, 2014 | Paydar |
| 20140237796 | A1 | Aug. 28, 2014 | Durocher |
| 20150234201 | A1 | Aug. 20, 2015 | Levesque |

The patents and patent application publications in the tables above all describe retaining devices and systems that are lacking in the ability for the user to alter the visual aesthetics of the holder with commonly available ornamental nail bearing type indicia.

It is an object of this disclosure to provide a novel unanticipated retaining apparatus capable of securing eyewear and the like, adapted to be securely and removably attached to portions of garments and the like such as, for example, a shirt, coat, purse, backpack, baseball cap, or similar, and having the ability to removably and interchangeably attach and retain an ornamental nail bearing pendant type element such as a hatpin, lapel pin, trading pin, or the like thereto. A review of prior disclosures within the crowded eyewear retention art does not disclose nor fairly suggest, either alone or in combination with any other reference, the object of the disclosed invention herein. After submitting the Provisional Patent Application No. 62/297, 847, product research and evaluation revealed many people, in and outside the eyewear retention field, deemed the disclosed magnetic multipurpose wearable retainer to be the most functional, innovative, and "coolest" retainer they have ever seen.

SUMMARY OF THE INVENTION

Embodiments of the present magnetic multipurpose wearable retainer disclosure include a system and method for interchangeably attaching and securing ornamental pendant type elements bearing a nail such as hatpins, trading pins, lapel pins, tie tacks, stud earrings, and the like thereto. The wearable retainer assembly comprises a retention method for securing ornamental pendant type elements having a nail; a hoop for securing an item such as a pair of eyeglasses via the eyewear lug; and a means of attaching the wearable retainer assembly to an article of clothing, purse, backpack, jacket, or similar items as well as magnetically attractive surfaces and objects.

A particular advantage of the present disclosure is the ability to interchangeably attach and display the ornamental pendant type elements to the wearable retainer. Even though the nail type indicia are designed to penetrate the material of the item to which they are attached, the wearable retainer assembly eliminates such material damaging means of attachment.

Another advantage of the present disclosure is the ability to display a permanent logo or emblem in addition to the user selected ornamental pendant type element.

Yet another advantage of the present invention is the resiliently flexible coated teardrop shaped retainer hoop for interchangeably securing items such as eyewear and earbuds.

Still yet another advantage of the present disclosure is the shape of the retainer retaining base, which reduces the noticeableness of said retainer retaining base when in-use beneath a garment.

Stated generally, the present magnetic multipurpose wearable retainer disclosed herein comprises a system for interchangeably attaching nail, or pin, type indicia, to an apparatus capable of retaining eyewear, while providing a means of attaching the wearable retainer to a plurality of clothing attire and accessories.

The novel features which are considered as characteristic of the disclosure are set forth, in particular, in the appended claims. The disclosure itself, however, both as to its construction and its method of operation, together with additional objects and advantages thereof, will be best understood from the following description of specific embodiments when read in connection with the accompanying drawings.

BRIEF DESCRIPTION OF THE DRAWINGS

It is noted that the drawings illustrate only exemplary embodiments of the invention and are, therefore, not to be considered limiting of its scope, for the disclosure may admit to other equally effective embodiments. The advantages and features of the present disclosure will become better understood with reference to the following detailed description and claims taken in conjunction with the accompanying drawings, wherein like elements are identified with like symbols, in which:

Figure 1:
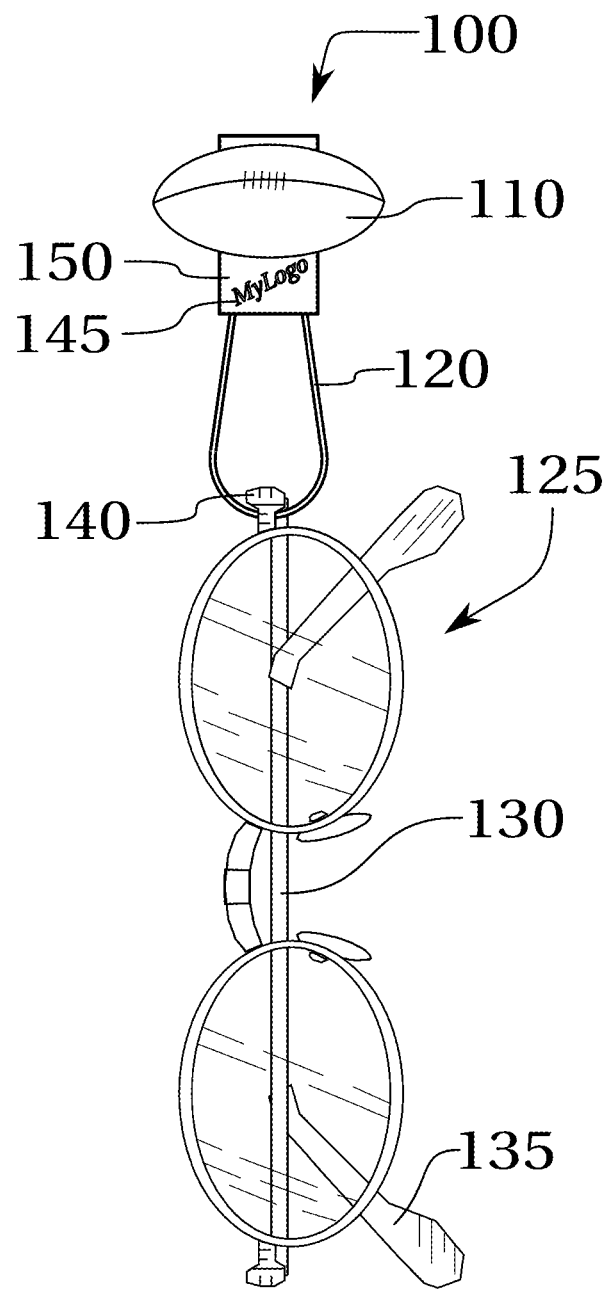
FIG. 1 is a front orthogonal view illustrating a pair of eyeglasses and a football hatpin attached thereto, according to the preferred embodiment of the present invention.

| Drawings - Reference Numerals | |
|---|---|
| 100 | magnetic multipurpose wearable retainer; multipurpose wearable retainer; wearable retainer; magnetic retainer member |
| 110 | ornamental pendant; ornamental indicia pin; hatpin; nail bearing type indicia |
| 120 | teardrop shaped retaining hoop; retaining hoop |
| 130 | eyewear temple bar - the long arms on the sides of the frame that extend from the temple hinge to the earpiece |
| 135 | eyewear earpiece - the part that rests on and behind the wearer's ears when eyewear is worn |
| 140 | eyewear lug - the section between the end piece and temple bar hinge; sometimes referred to as the section between the joints- the temple joint or hinge, and the end piece joint connecting the lens frame; this disclosure considers the eyewear lug to be the section between said joints |
| 150 | permanent logo area |
| 220 | spur offset ring |
| 240 | ornamental pendant nail aperture |
| 305 | ornamental pendant rubber clutch |
| 315 | ornamental pendant nail; pendant post; pendant pin |
| 325 | ornamental pendant spur |
| 345 | wearable retainer spur |
| 825 | non-teardrop shaped retaining hoop |
| 1210 | eyewear having a larger end piece and lug |
| 1300 | wearable retainer retaining base; retainer retaining base; magnetically attractive retainer retaining base member |
| 1500 | small wearable retainer retaining base |

DETAILED DESCRIPTION

The exemplary embodiments described herein in detail for illustrative purposes are subject to many variations in structure and design. It should be emphasized, however, that they are not intended to be exhaustive or to limit the present disclosure to the precise forms disclosed, and obviously many modifications are possible in light of the teaching herein. It is understood that various omissions and substitutions of equivalents are contemplated as circumstances may suggest or render expedient, but these are intended to cover the application or embodiments without departing from the spirit or scope of the claims of the present disclosure.

The following brief definition of terms shall apply throughout the application:

A magnet or "magnetic material" is defined as a body having the property of attracting iron and producing a magnetic field external to itself; "ferromagnetic material" or "ferromagnetic body" is defined as materials that are attracted to a magnet; "magnetically attractive" element may be either a magnet or a ferromagnetic body, or a member containing a magnet or a ferromagnetic material. The term "attractive magnetic communication" means items being magnetically attractive or magnetically affixed via magnetically attractive properties.

The term "nail type indicia" means an ornamental pendant type indicia having a nail protruding from the back of said indicia for attachment means.

The terms "including," "comprising," or "having" and variations thereof herein is meant to encompass the items listed thereafter and equivalents thereof as well as additional items. Further, the terms, "a" and "an" herein do not denote a limitation of quantity, but rather denote the presence of at least one of the referenced item. Unless limited otherwise, the terms "attached," "coupled," and variations thereof herein are used broadly and encompass direct and indirect attachments and couplings.

The phrases "in one embodiment," "according to one embodiment," and the like generally mean that the particular feature, structure, or characteristic following the phrase may be included in at least one embodiment of the present disclosure, and may be included in more than one embodiment of the present disclosure. Moreover, such phrases do not necessarily refer to the same embodiment. Further, when a particular feature, structure or characteristic is described in connection with an embodiment, it would be within the knowledge of one skilled in the art to effect such feature, structure or characteristic in connection with other embodiments whether or not explicitly described.

If the specification describes something as "exemplary" or an "example," it should be understood that refers to a non-exclusive example.

If the specification states a component or feature "may," "can," "could," "should," "preferably," "possibly," "typically," "optionally," or "might" (or other such language) be included or have a characteristic, that particular component or feature is not required to be included or to have the characteristic. Such component or feature may be optionally included in some embodiments, or it may be excluded.

Unless the meaning is clearly to the contrary, all ranges set forth herein are deemed to be inclusive of the endpoints.

The terms "wearable retainer", "multipurpose wearable retainer", "magnetic multipurpose wearable retainer", and "magnetic retainer member" are equivalent; the terms "retainer retaining base", "wearable retainer retaining base", "multipurpose wearable retainer retaining base", "magnetic multipurpose wearable retainer retaining base", and "magnetically attractive retainer retaining base member" are equivalent.

The eyewear lug is defined to be the section of the eyewear between the temple joint and the end piece joint connecting the lens frame.

All references being made herein to direction, relative positions, and orientation of the magnetic multipurpose wearable retainer 100, refer to the position of the preferred embodiment of the wearable retainer 100 as shown in FIG. 1, which coincides with that in which the wearable retainer 100 is viewed by an observer when in-use by the wearer. Where the specification references the "front" or "front side" (not labeled) of the wearable retainer 100, that reference refers to the side nearest the observer and furthest away from the wearer; the front of the wearable retainer 100 is the side to which the ornamental indicia pin 110 attaches. A reference to the "right" or "right side" (not labeled), refers to the right side with respect to the observer when viewing the wearable retainer 100 when in-use by the wearer; similarly the "left" or "left side" (not labeled) refers to the left side with respect to the observer. A reference to the "back" or "back side" 320 refers to the side furthest from an observer and thus nearest the wearer of the wearable retainer 100; the back 320 is the side nearest the multipurpose wearable retainer retaining base 1300 when in-use. A reference to the "bottom" or "bottom side" 210 refers to the direction or side from which the wearable retainer 100 retaining hoop 120 extends from said wearable retainer 100. A reference to the "top" or "top side" (not labeled) refers to the side opposite the bottom side 210 of said wearable retainer 100.

With reference to eyewear, the expression "opened position" refers to the position taken when the eyewear is being worn, that is, the temple bars are substantially perpendicular to the lens'. Similarly, the expression "closed position" refers to eyewear being in the folded position, that is, the temple bars are substantially parallel to the lens' as shown in FIG. 1.

Figure 13:
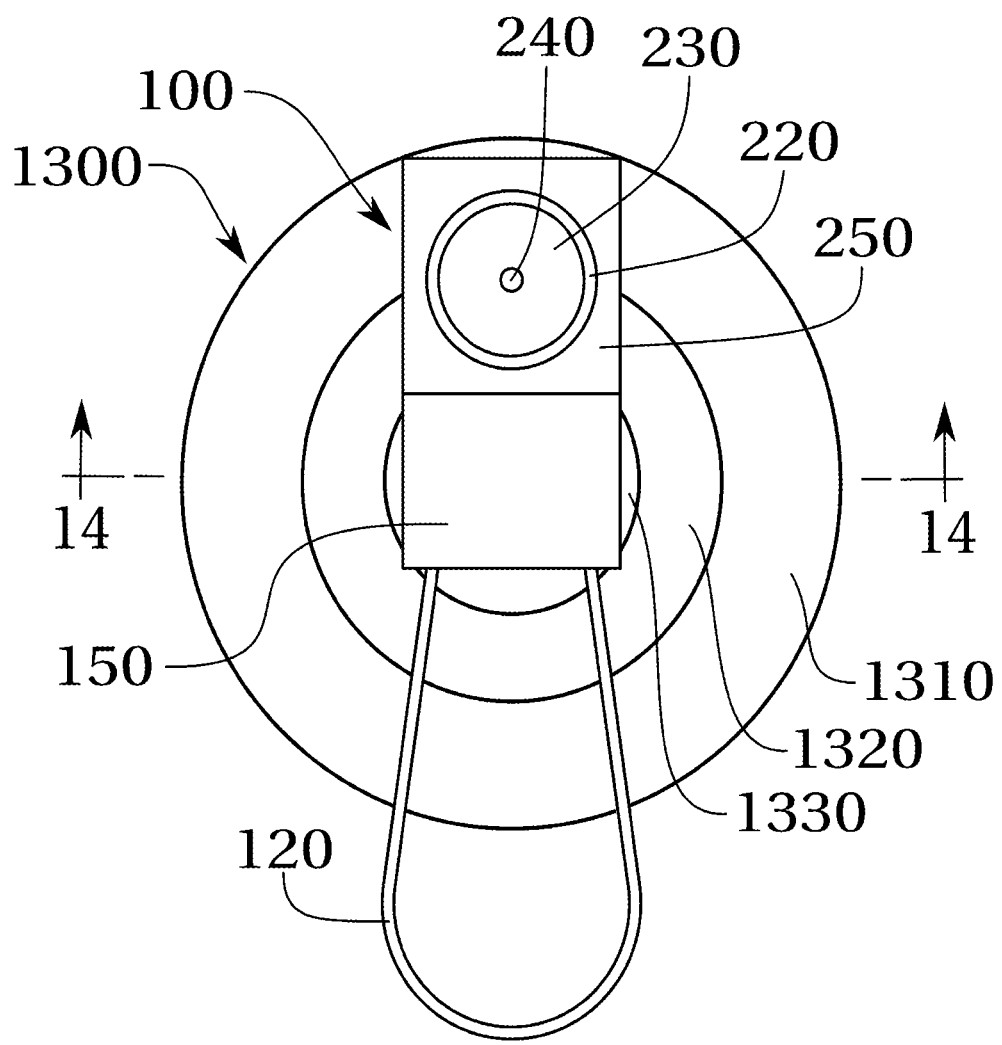
FIG. 13 is a front orthogonal view of the wearable retainer retaining base with the wearable retainer directly attached thereto.

All references being made herein to direction, relative positions, and orientation of the magnetic multipurpose wearable retainer retaining base 1300, refer to the position of the preferred embodiment of said wearable retainer retaining base 1300 as shown in FIG. 13. Where the specification references the "front" or "front side" (not labeled) of the wearable retainer retaining base 1300, that reference refers to the side nearest the observer and furthest away from the wearer; the front of said wearable retainer retaining base 1300 is the side having the raised center surface and is nearest the back side 320 of the magnetic multipurpose wearable retainer 100 when in-use. A reference to the "right" or "right side" (not labeled), refers to the right side with respect to the observer when viewing said wearable retainer retaining base 1300 when attached to the magnetic multipurpose wearable retainer 100 as shown in FIG. 13; similarly the "left" or "left side" (not labeled) of the wearable retainer retaining base 1300 refers to the left side with respect to FIG. 13. A reference to the "back" or "back side" 1430 of the wearable retainer retaining base 1300 refers to the side furthest from an observer and thus nearest the wearer. A reference to the "bottom" or "bottom side" (not labeled) of the wearable retainer retaining base 1300 refers to the direction or side of which said wearable retainer 100 retaining hoop 120 extends over the wearable retainer retaining base 1300 when in-use. A reference to the "top" or "top side" (not labeled) of the wearable retainer retaining base 1300 refers to the side opposite the bottom side 1430 of said wearable retainer retaining base 1300.

Figure 15:
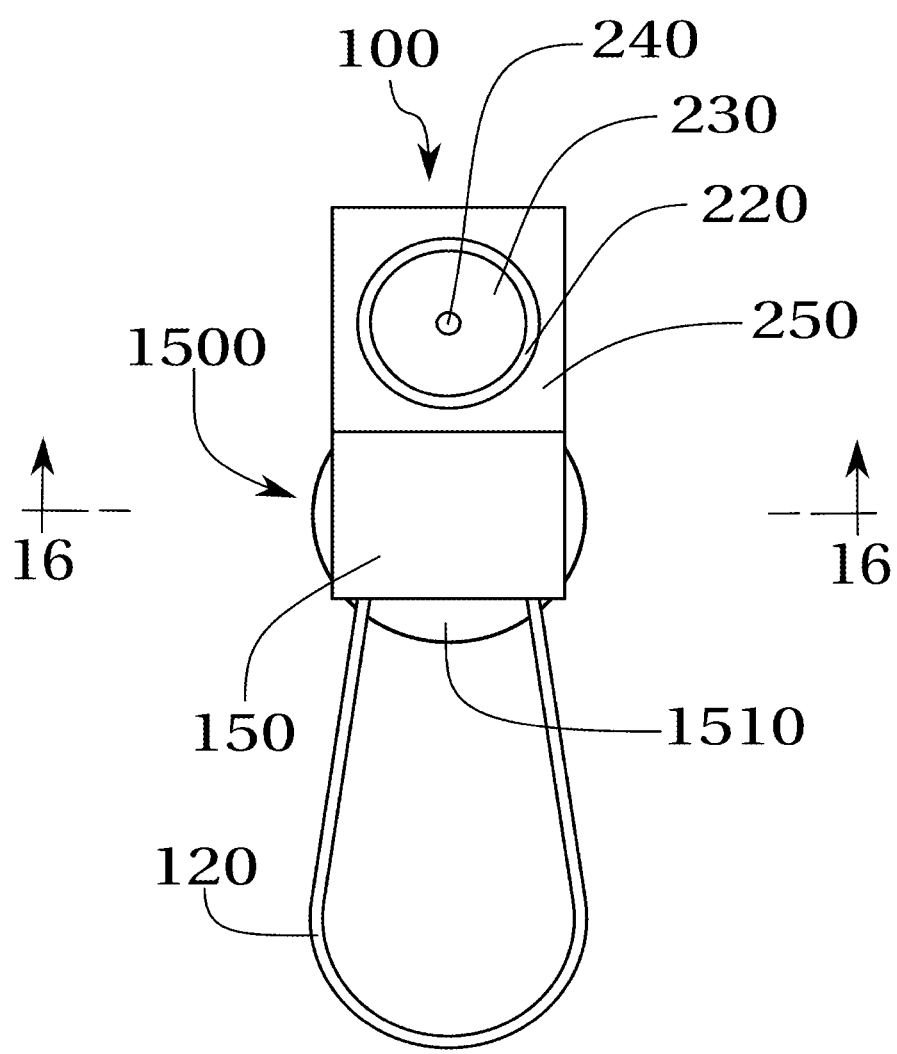
FIG. 15 is a front orthogonal view of the small wearable retainer retaining base directly attached thereto, suitable for affixing the wearable retainer to items of ridged materials, or items where surface area is inadequate for mounting the wearable retainer retaining base in FIG. 13.

All references being made herein to direction, relative positions, and orientation of the small magnetic multipurpose wearable retainer retaining base 1500, refer to the position of the embodiment of said small retainer retaining base 1500 as shown in FIG. 15. Said small retainer retaining base 1500 direction references have a direct correlation with the direction references of said wearable retainer retaining base 1300, and are thus not repeated.

All references being made herein to length, relative to height, width, and depth of the magnetic multipurpose wearable retainer 100, refer to the position of said wearable retainer 100 as shown in FIG. 1 which coincides with that in which said wearable retainer 100 is viewed by an observer when in-use by the wearer. A reference to the "height" (not labeled) refers to the distance between said wearable retainer 100 front side and said wearable retainer 100 back side 320, at the largest distance between two said sides unless otherwise noted. A reference to the "width" (not labeled) refers to the distance between said wearable retainer 100 left side and right side. A reference to "depth" (not labeled) refers to the distance between said wearable retainer 100 bottom side and top side.

All references being made herein to length, relative to height, width, and depth of the magnetic multipurpose wearable retainer retaining base 1300, refer to the position of said wearable retainer retaining base 1300 as shown in FIG. 13. A reference to the "height" (not labeled) refers to the distance between said wearable retainer retaining base 1300 front side and back side 1430, at the greatest distance between said sides unless specified otherwise. A reference to the wearable retainer retaining base 1300 "width" (not labeled) refers to the greatest distance between said retainer retaining base left side and right side. A reference to the "depth" (not labeled) of said wearable retainer retaining base 1300 refers to the greatest distance between said retainer retaining base 1300 bottom side and top side.

All references being made herein to length, relative to height, width, and depth of the small magnetic multipurpose wearable retainer retaining base 1500, refer to the position of said small retainer retaining base 1500 as shown in FIG. 15, where length references have a direct correlation with the length references of said wearable retainer retaining base 1300, and are thus not repeated.

The following descriptions are made referring to the figures, wherein identical reference numerals refer to like features throughout this disclosure.

Referring now to the drawings in detail, the preferred embodiment of the present disclosure is shown in FIGS. 1-3B. Turning briefly specifically to FIG. 1, it may be seen that the reference numeral 100 has been used herein to identify a preferred embodiment of the magnetic multipurpose wearable retainer 100, or magnetic retainer member, of the present disclosure. The wearable retainer 100 is shown displaying a user selected football hatpin 110, and permanent text 145 in the logo area 150. The logo area 150 is a surface suitable for marking methods such as etching, engraving, and milling, as well as adhesively bonding, thermally welding, or mechanically affixing permanent emblems and the like thereto. A logo can even be molded into the logo area 150 at the time of manufacturing the wearable retainer 100. It is to be understood that the term logo can mean any wording, symbol, artwork or some combination thereof. The logo area 150 can display, for example, the logo or emblem of a company, college, band, non-profit organization, or sports team. It should be understood that this list is representative and not limiting. The wearable retainer 100 can be attached to an article of clothing such as a shirt 900 or jacket 1000, or an accessory such as a purse 1100, cap 1200, or backpack (not shown).

The wearable retainer 100 is not limited to a rectangular shape, and can be of any suitable shape, including circular, triangular, oval, or polygonal. A reason for choosing the selected shape of the preferred embodiment 100, is due to reduced material and manufacturing costs. The wearable retainer 100 includes, as its main components, a nail aperture 240 for receiving the nail 315 portion of a desired ornamental pendant 110, and a teardrop shaped retaining hoop 120 member that is permanently connected to the bottom side 210 of the wearable retainer 100.

The ornamental pendant spur cavity 230 of the wearable retainer 100, allows user selected ornamental pendants 110 that have a spur 325 to set flush with the face 250 of said wearable retainer 100. The height of the spur cavity wall 255, is equal to or greater than the length of the ornamental pendant spur 325. The raised edge of the spur offset ring 220 protruding from the wearable retainer face 250 allows the ornamental pendant back 335, to be parallel with said wearable retainer face 250. Specifically, said spur offset ring 220 and the ornamental pendant back 335 are abutted against each other.

Figure 2:
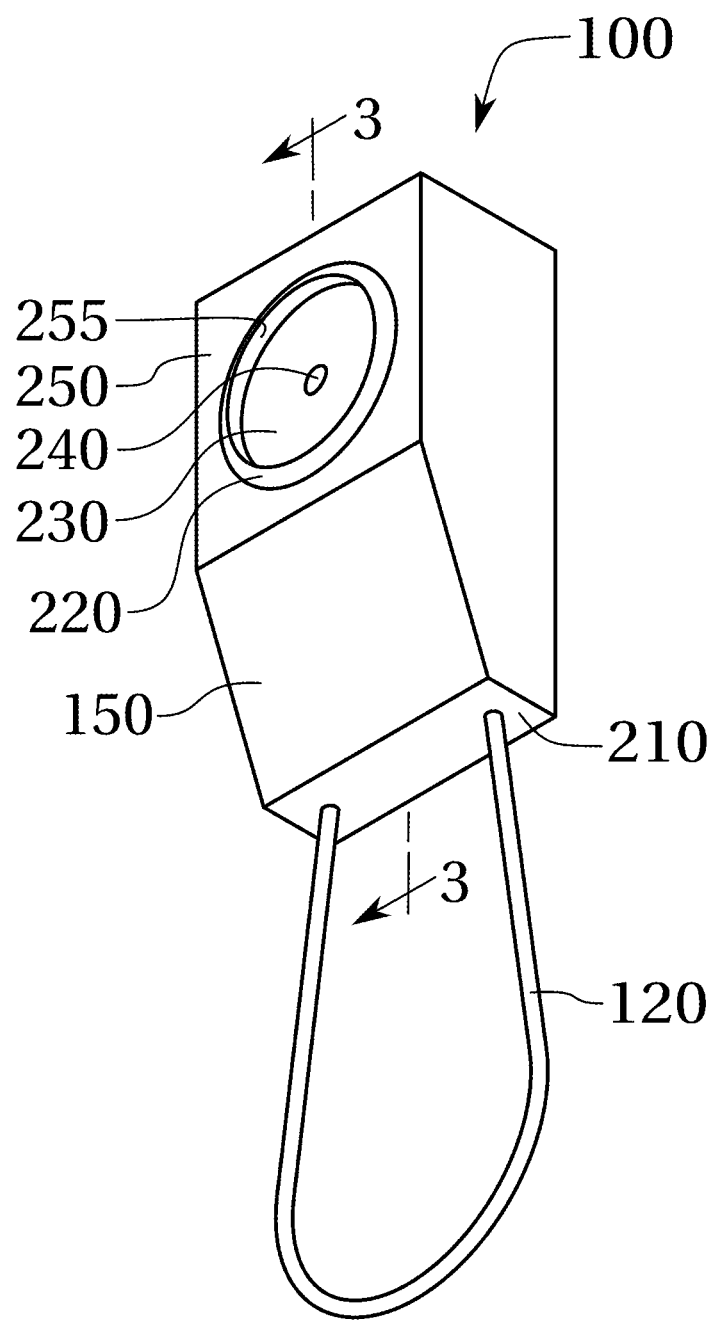
FIG. 2 is a perspective view of the preferred embodiment of the present invention.
Figure 3A:
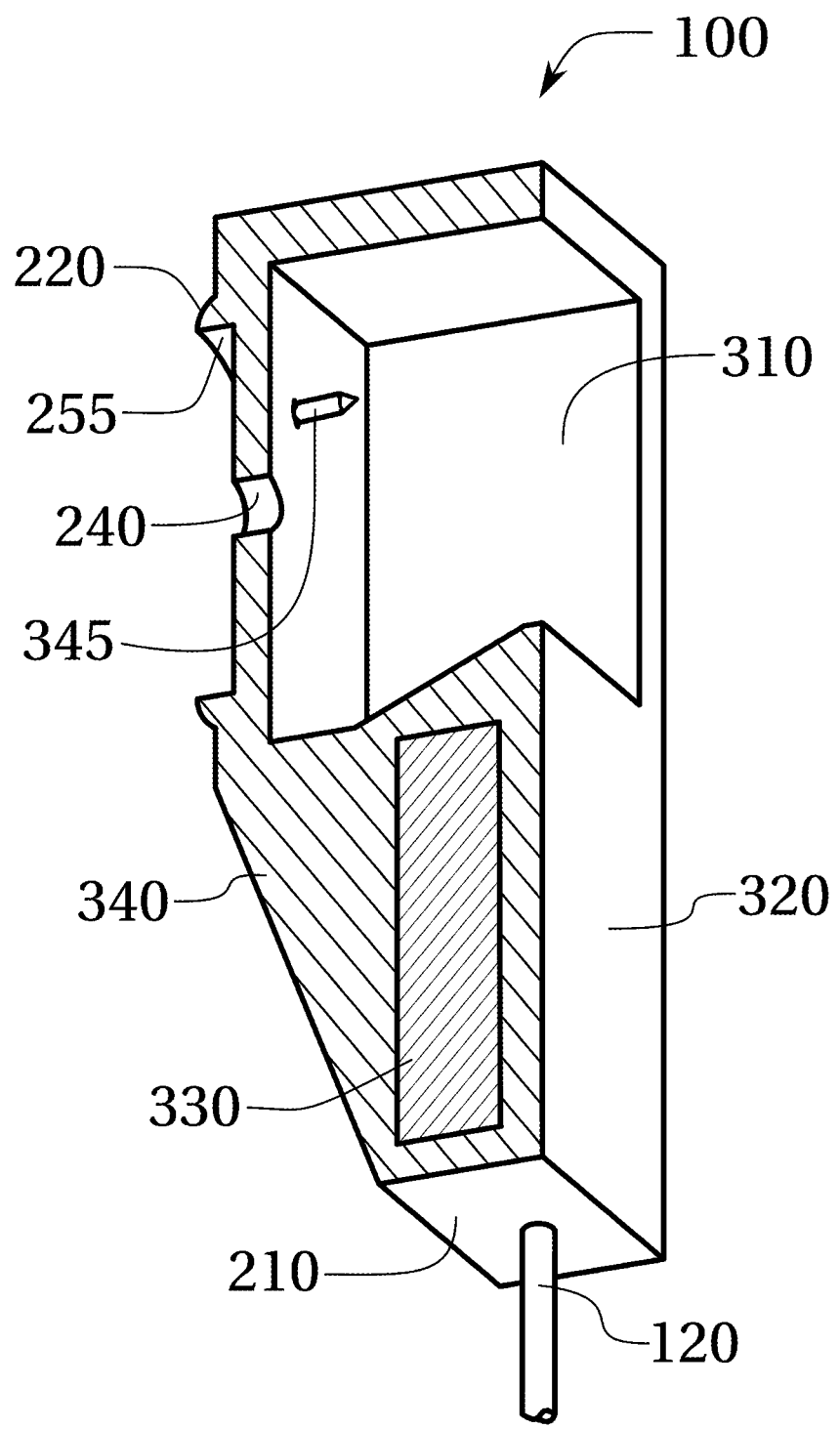
FIG. 3A is a cross-sectional perspective view taken along line 3-3 of FIG. 2, showing magnetic material, and cavity for retaining material or an ornamental pendant clutch.

FIG. 3A is a cross-sectional view of the form shown in FIG. 2 along line 3-3. The wearable retainer 100 can be constructed of any suitable material 340 such as, but not limited to, metals, plastics, wood, rubber, rubberized PVC or other rubberized materials.

In the preferred embodiment 100 of the disclosure, the magnet 330 disposed therein is a rare earth magnet having its south magnetic pole (not labeled) oriented towards the back side 320 of said preferred embodiment 100. The most common types of rare earth magnets are NdFeB, also referred to as NIB, or Neo, or Neodymium Iron Boron. Rare earth magnets are also made of other materials including samarium cobalt and toughened rare earth materials. The rare earth magnets composed of toughened rare earth materials are among the strongest and are preferred in embodiments of the disclosure.

In this embodiment 100 the wearable retainer spur 345 pierces the ornamental pendant rubber clutch 305, thereby securing said clutch in place and maintaining the direction of the ornamental pendant 110 front side with respect to the wearable retainer face 250. The ornamental pendant nail 315 is retained in place by frictional contact with said ornamental pendant rubber clutch 305 nail aperture wall 540. Alternatively, the rubber retainer clutch cavity 310 may be filled with suitable material capable of maintaining frictional contact with a portion of the ornamental pendant nail 315, such that said ornamental pendant nail 315 is frictionally releasably secured.

The back side of the preferred embodiment 320 provides an area suitable for consumer information such as "Patent Pending" and the like.

Figure 3B:
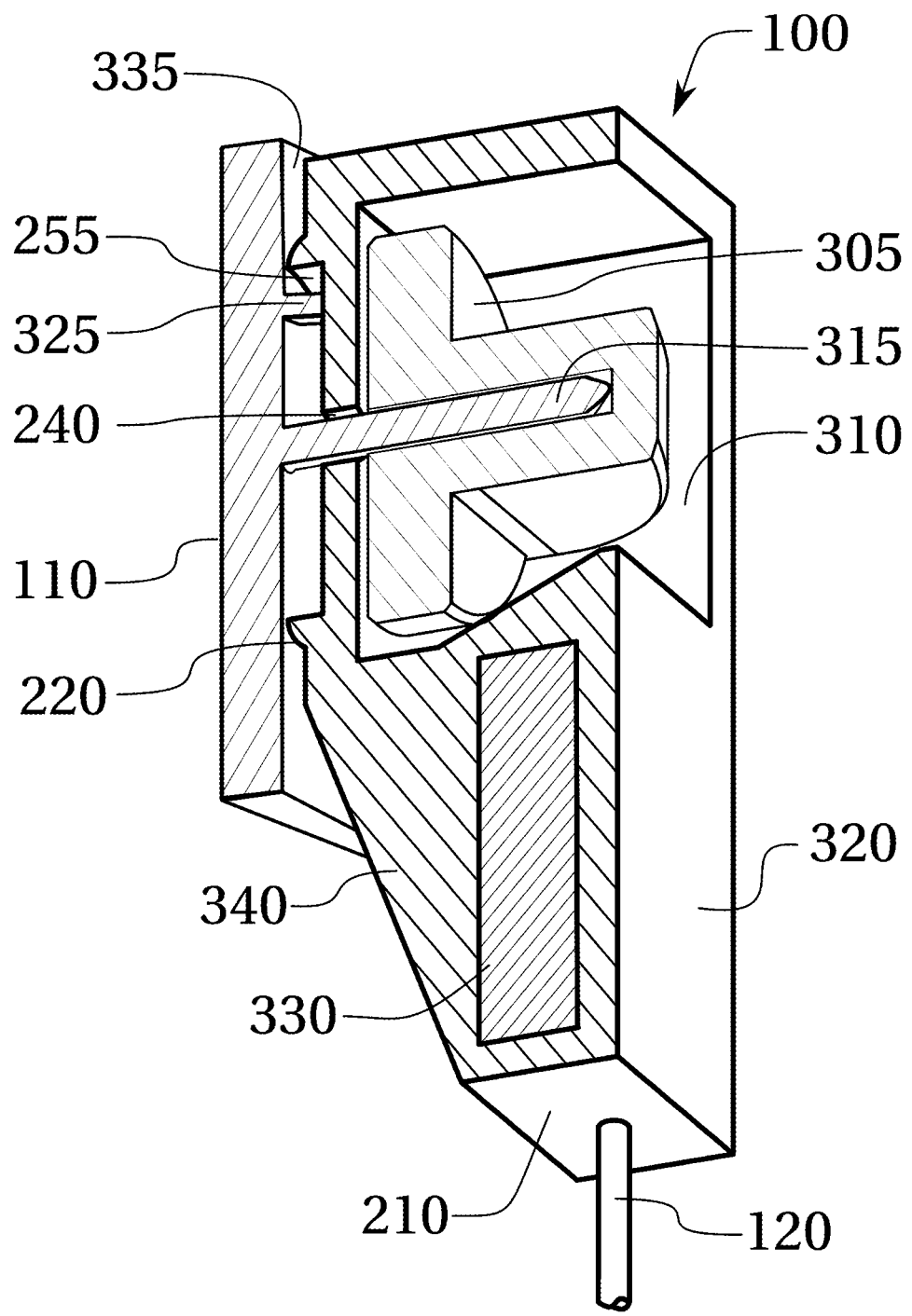
FIG. 3B is a cross-sectional perspective view taken along line 3-3 of FIG. 2, showing magnetic material, rubber hatpin clutch (not shown in FIG. 3A), and hatpin attached (not shown in FIG. 3A) thereto.

Turning briefly to FIG. 3B, an ornamental pendant rubber clutch 305 is removably secured to the embodiment 100 via the retainer spur 345 (not visible in FIG. 3B), and to the ornamental pendant 110 via the indicia nail 315 frictionally engaged with the ornamental pendant rubber clutch 305 through the wearable retainer nail aperture 240. More specifically, the indicia nail 315 is inserted into the receiving aperture 240 of the wearable retainer 100 wherein frictional or clamping means exist to removably secure said indicia as described herein. Not all nail type indicia are comprised of ferrous materials and thus attracted to magnets, therefore said clamping means are utilized.

This embodiment 100 allows a user to replace the ornamental pendant rubber clutch 305, via the back opening of the retainer clutch cavity 310, should the retaining abilities of the rubber clutch aperture 540 diminish.

The orientation of the front side of the ornamental pendant 110 with respect to the magnetic multipurpose wearable retainer face 250, is maintained by the wearable retainer spur 345 within the pendant clutch cavity 310. The wearable retainer spur 345 pierces the ornamental pendant rubber clutch 305 thereby maintaining the desired orientation with respect to the wearable retainer face 250.

Additionally, other types of ornamental pendant clutch mechanisms, such as the deluxe or flat top clutch (not shown), can be incorporated for improved securement means. In other embodiments, the pendant clutching mechanism is integrated within the wearable retainer embodiment 600. It will be understood that the composition of an integrated clutch 630 may take many forms, including, but not limited to, rubber, metal, foam, and plastic.

Figure 4:
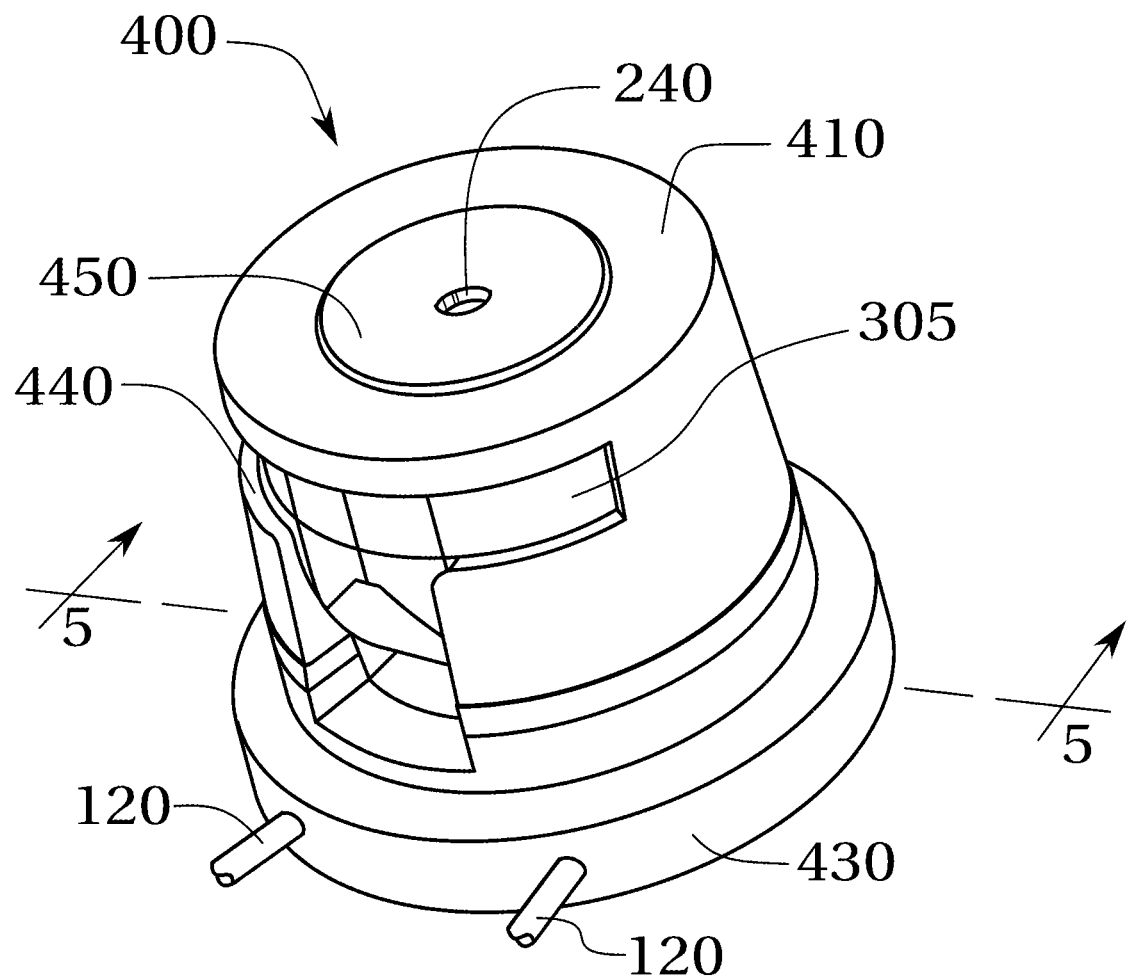
FIG. 4 is a perspective view illustrating an opening for the user replaceable rubber clutch, according to an embodiment of the present invention.

In the embodiment shown in FIG. 4, the ornamental pendant rubber clutch 305 is visible through the wearable retainer embodiment 400 clutch cavity opening 440. This embodiment 400 provides a raised circular top surface 450, at a height of at least the length of the pendant spur 325 from the wearable retainer face 410.

Said raised circular top surface 450 provides a surface for the ornamental pendant 110 area between the nail 315 and spur 325 to rest flush against, such that said spur 325 does not prevent the ornamental pendant back 335 from being flush with said raised circular top surface 450, and thus allowing the front side of the ornamental pendant 110 and wearable retainer face 410 to be parallel. Specifically, said raised circular top surface 450 and the ornamental pendant back 335 are abutted against each other.

Figure 5:
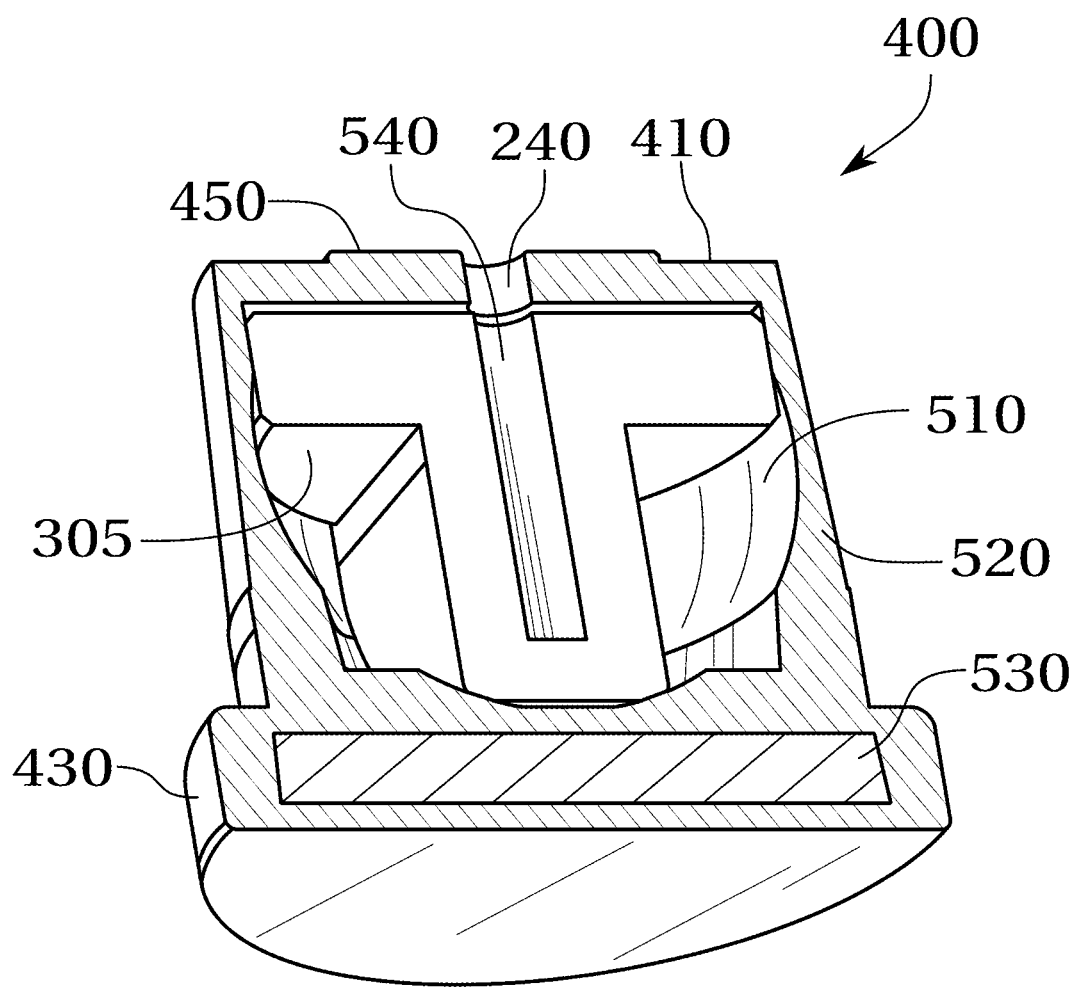
FIG. 5 is a cross-sectional perspective view taken along line 5-5 of FIG. 4, showing magnetic material, and the rubber hatpin clutch.

FIG. 5 is a cross-sectional view of the form shown in FIG. 4 along line 5-5. The magnetic material 530 in this embodiment 400 is directly beneath the pendant clutch cavity 510, thereby reducing the depth and width of the back side (not labeled) of the wearable retainer embodiment 400 to the size needed to encompass the magnetic material 530 therein. The embodiment material 520 can be comprised of plastic, rubber, rubberized PVC, or any other suitable type of material or combination thereof. The diameter of the ornamental pendant nail aperture 240 is greater than or equal to the rubber clutch nail aperture 540.

Figure 6:
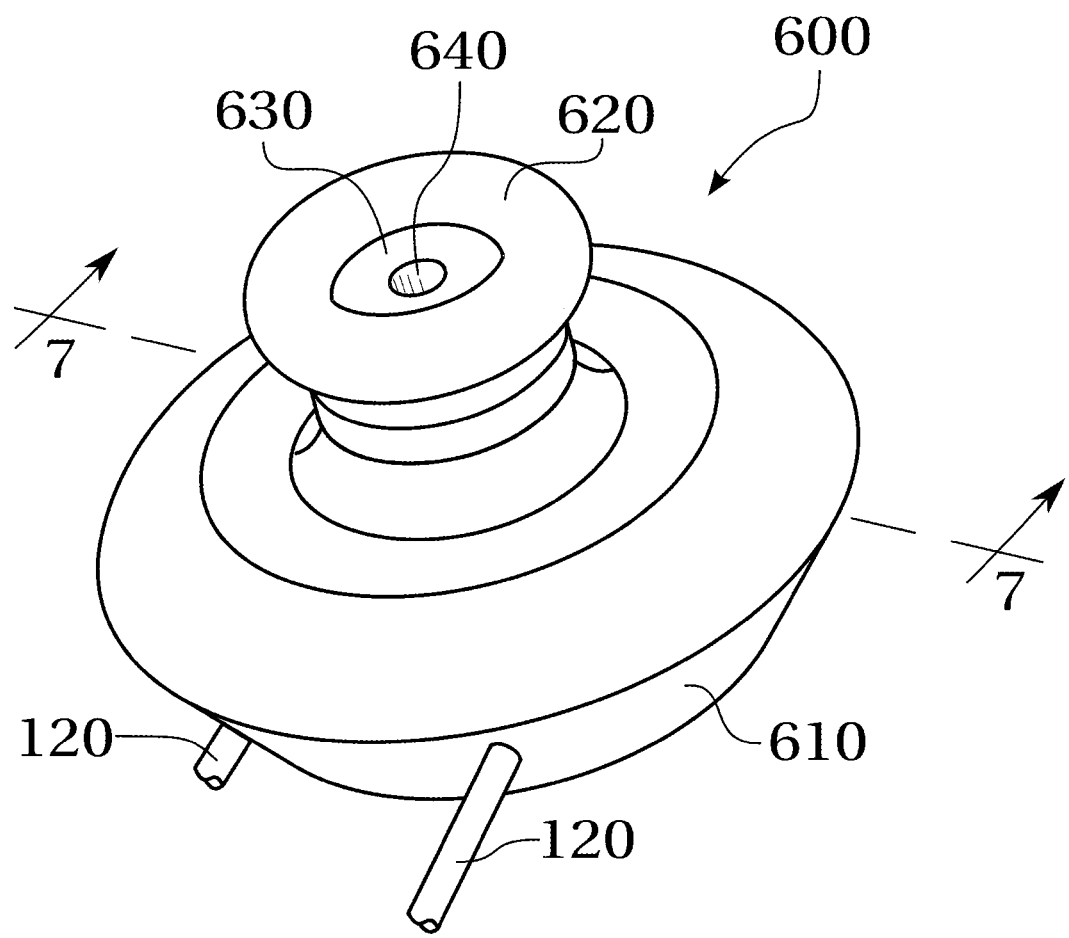
FIG. 6 is a perspective view wherein the ornamental pendant nail retaining material is permanently disposed therein, according to an embodiment of the present invention.

FIG. 6 illustrates an embodiment of the wearable retainer 600 in which the ornamental pendant nail clutch mechanism 630 is integrated into the wearable retainer embodiment material 720. The distance between the surface of the nail clutch mechanism 630 and the embodiments topmost surface 620 on which the ornamental pendant back side 335 rests when in-use, may be less than the length of the pendant spur 325. The distance between said surfaces is proportional to the pliability of said nail clutch mechanism 630 material. Said distance between surfaces is determined by subtracting the depth to which the ornamental pendant spur 325 penetrates said clutch mechanism material 710, when the ornamental pendant nail 315 is inserted into the pendant nail aperture 640, from the length of said spur 325. More pliable clutch mechanism material 710 that allow the entire length of the spur 325 to penetrate, require little if any distance between said surfaces. The angle of the bottom portion 610 of this embodiment 600 provides a better means of grasping said wearable retainer 600 when removing it from the wearable retainer retaining base 1300.

Figure 7:
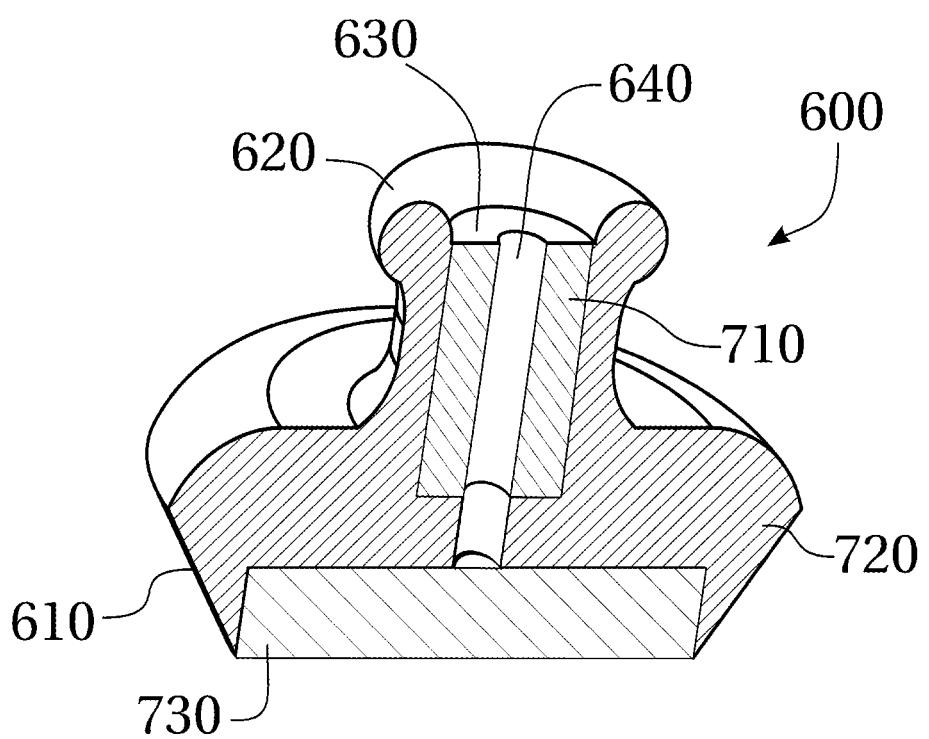
FIG. 7 is a cross-sectional perspective view, taken along line 7-7 of FIG. 6, showing the magnetic material and hatpin nail securing material permanently disposed therein.

FIG. 7 is a cross-sectional view of the form shown in FIG. 6 along line 7-7. The ornamental pendant nail clutch material 710 can be comprised of rubber, rubberized PVC, or any other suitable type of material or combination thereof that exhibit a coefficient of friction necessary to releasably retain the ornamental pendant nail 315 in the wearable retainer nail clutch aperture 640. The embodiment material 720 can be comprised of plastic, rubber, rubberized PVC, or any other suitable type of material or combination thereof. A rare earth magnet 730 is disposed within the bottom portion 610 of this embodiment 600.

Figure 8:
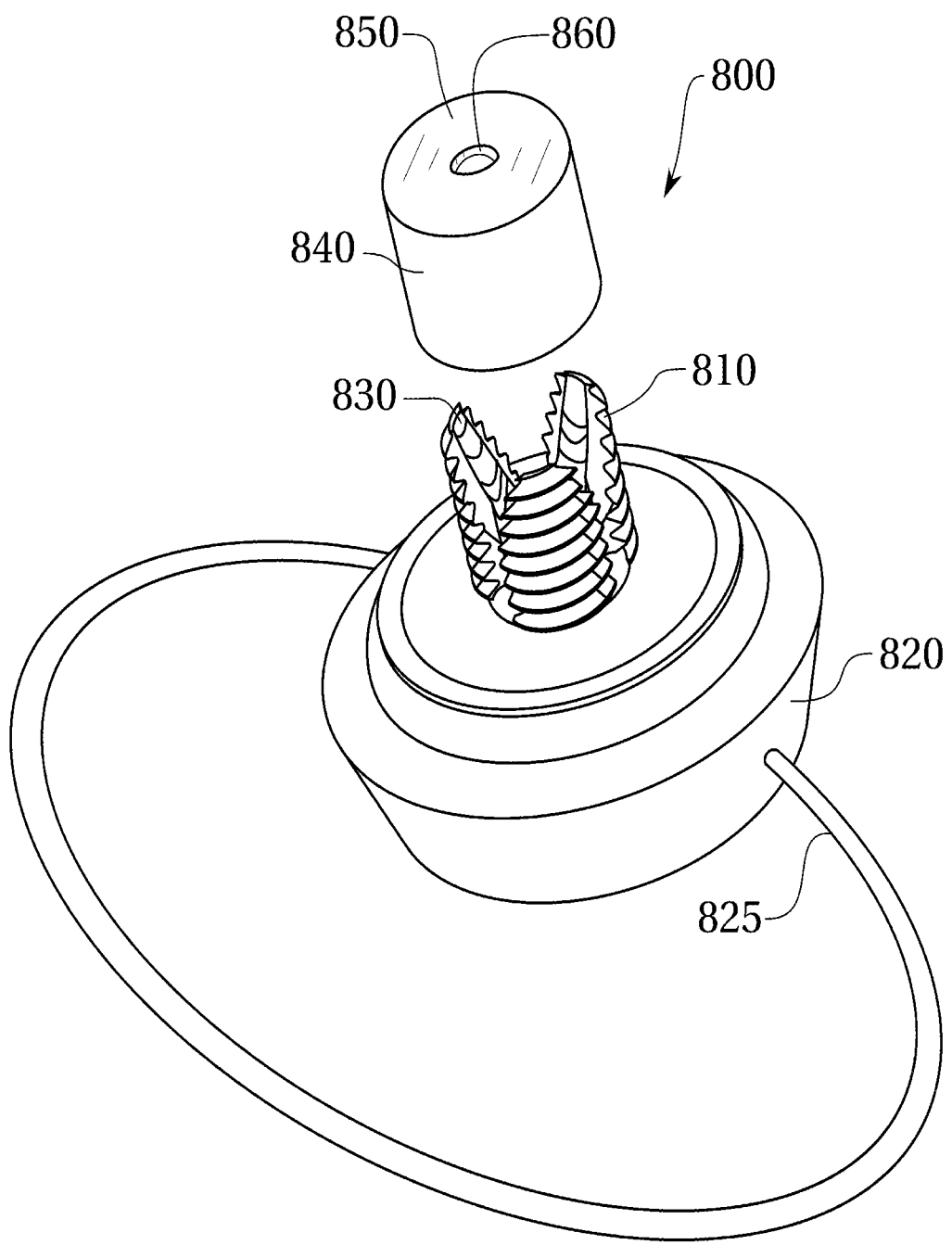
FIG. 8 is a perspective view illustrating a pendant nail adjustable frictional securing mechanism, depicting the hoop ends connected to the left and right side of the embodiment instead of the bottom, according to an embodiment of the present invention.

FIG. 8 illustrates a wearable retainer embodiment 800 which provides a chuck type mechanism for securely retaining the ornamental pendant nail 315. The cylindrical chuck or collar 840 is mounted about the plurality of jaws 830 and is in operative communication with said jaws 830 so that rotation of the chuck 840 in a clock-wise direction moves the jaws 830 into a fractionally gripping relationship with the ornamental pendant nail 315, and rotation of the chuck 840 in a counter clock-wise direction, releases said gripping relationship. Threads 810 formed on the jaw's 830 outer surface may be constructed in any suitable type and pitch. The diameter of the chuck 840 is such that the ornamental pendants spur 325 overhangs the face of the chuck 850. The curvature of the base 820 of this embodiment 800 provides a better means of grasping the wearable retainer when removing it from the wearable retainer retaining base 1300. The retaining hoop 825 is attached on opposite sides, or left and right (not labeled), of this embodiment 800, providing a wider hoop 825 aperture for retaining more or larger items (not shown) than can be retained by the aforementioned retainer retaining hoop 120 having both ends disposed on the bottom side 210.

Figure 9:
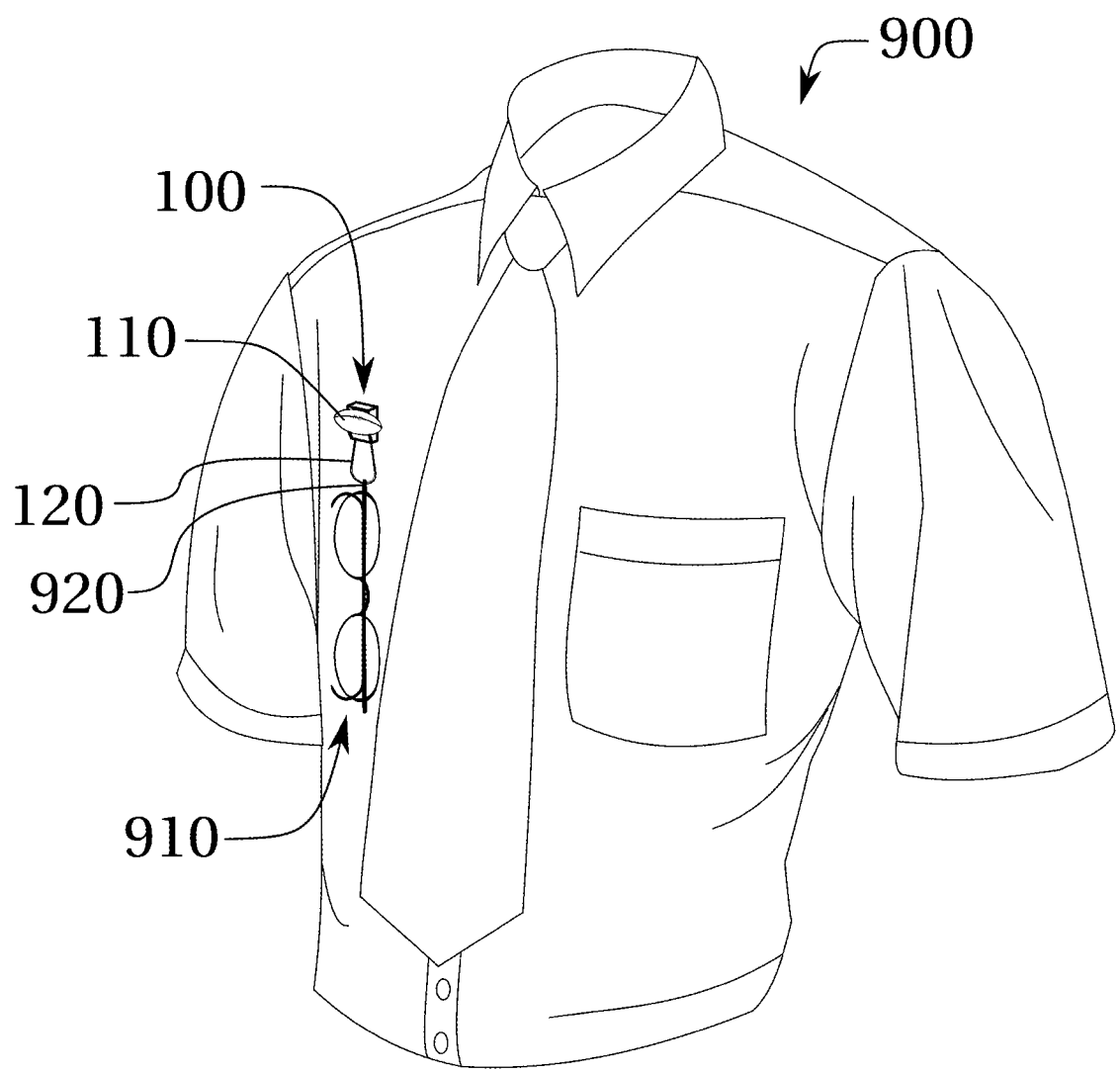
FIG. 9 is a perspective view of the preferred embodiment in a position as it may appear, in-use, when affixed to a shirt.

In-use, as shown in FIG. 9, a pair of eyeglasses 910 are attached to a shirt 900 via the wearable retainer retaining hoop 120. The lug 920 of the eyewear 910 is secured via the retaining hoop 120 of the wearable retainer 100.

Figure 10:
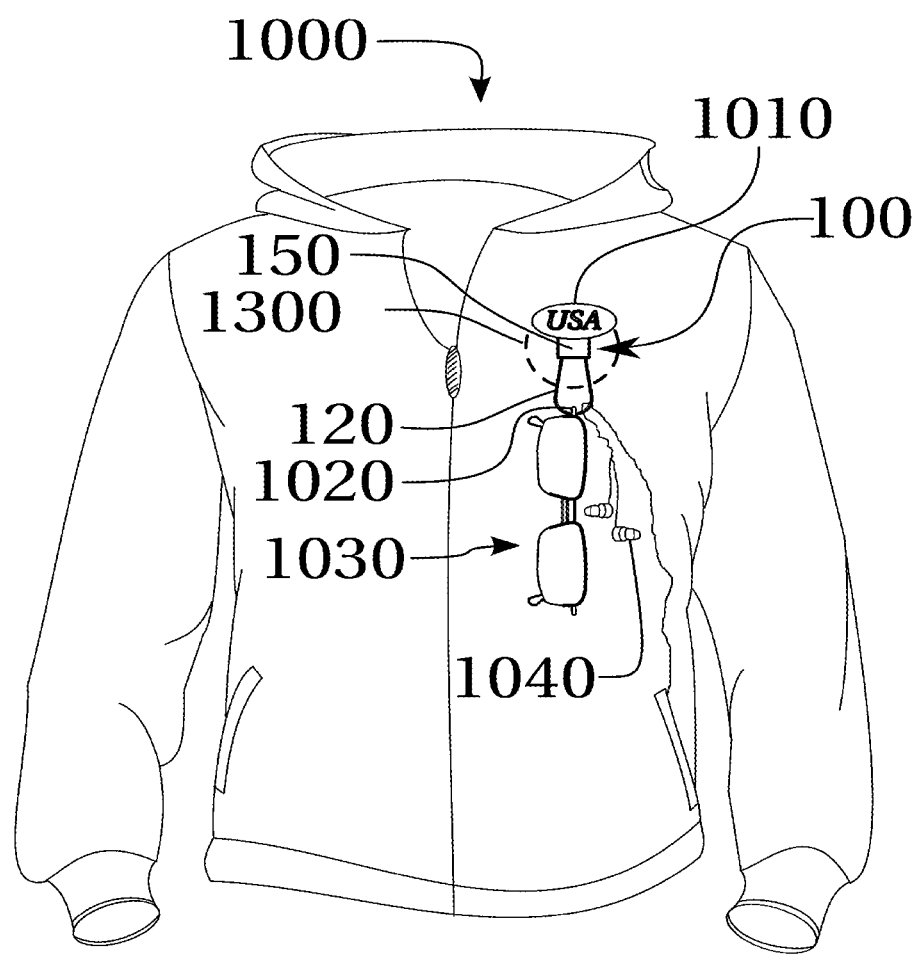
FIG. 10 is a perspective view of the preferred embodiment, in-use, affixed to a jacket illustrating multiple items being simultaneously retained thereon, and demonstrating a wearable retainer retaining base in-use.

As will be apparent to those of ordinary skill in the art, as illustrated in FIG. 10, the preferred embodiment of the wearable retainer 100 and retainer retaining base 1300 cooperate to secure the wearable retainer 100 in close abutting engagement to the jacket 1000. The retainer retaining base 1300 resiliently distributes the load of the eyewear 1030 over a broad area of the jacket 1000 to avoid or mitigate an unsightly stretching or pulling of the fabric about said wearable retainer 100. The ornamental pendant 1010 can be easily changed for a specific setting or occasion without removing the wearable retainer 100 from the article to which it is attached. Multiple items, including eyewear 1030 and earbuds 1040, are shown being simultaneously attached to said wearable retainer 100. The lug 1020 of said eyewear 1030 is removably secured via the retainer hoop 120 of the wearable retainer 100.

Figure 11:
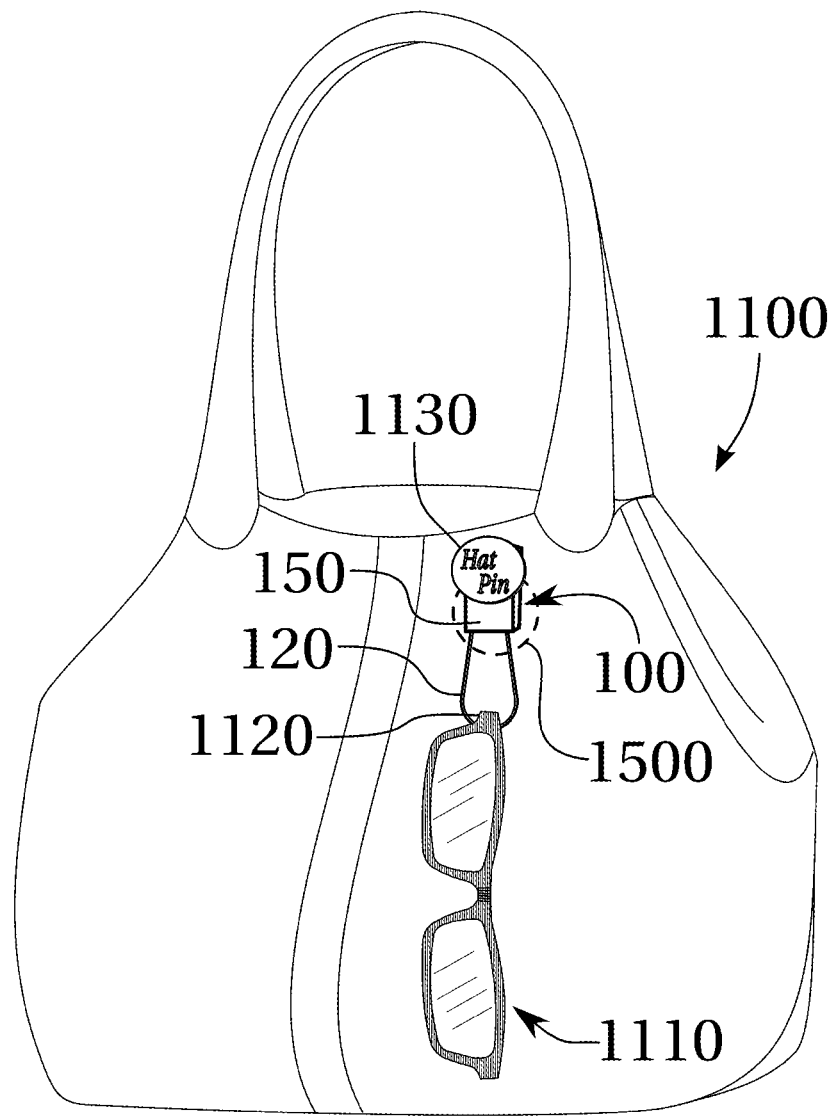
FIG. 11 is a perspective view of the preferred embodiment, in-use, affixed to a purse, and demonstrating a small wearable retainer retaining base in-use.

Eyewear placed in a handbag or purse 1100 may be difficult to locate and can easily be damaged or scratched by other items in the purse. FIG. 11 illustrates the wearable retainer 100 affixed to the purse 1100 using the small retainer retaining base 1500. Said small retainer retaining base 1500 is suitable for affixing the wearable retainer 100 to items comprised of rigid materials, such as the purse 1100, where the rigidity of the material provides the aforementioned stabilizing characteristics of the retainer retaining base 1300 illustrated in FIG. 13. The eyewear lug 1120 is secured by threading the ear piece (not shown) of the eyewear 1110 through the retaining hoop 120 of the wearable retainer 100, releasably secured to the side of the purse 1100, until the lug 1120 rests on the retaining hoop 120. The ornamental pendant 1130 could be any nail type pendant that fits the occasion, season, or attire, and can be changed as desired. The magnetic properties of said small retainer retaining base 1500 allows the wearable retainer 100 to be securely affixed without piercing or damaging the purse 1100. The wearable retainer 100 can alternately be affixed directly to a ferrous surface of an accessory. Such ferrous accessory surfaces may include clasps, buttons, buckles, and the like.

Figure 12:
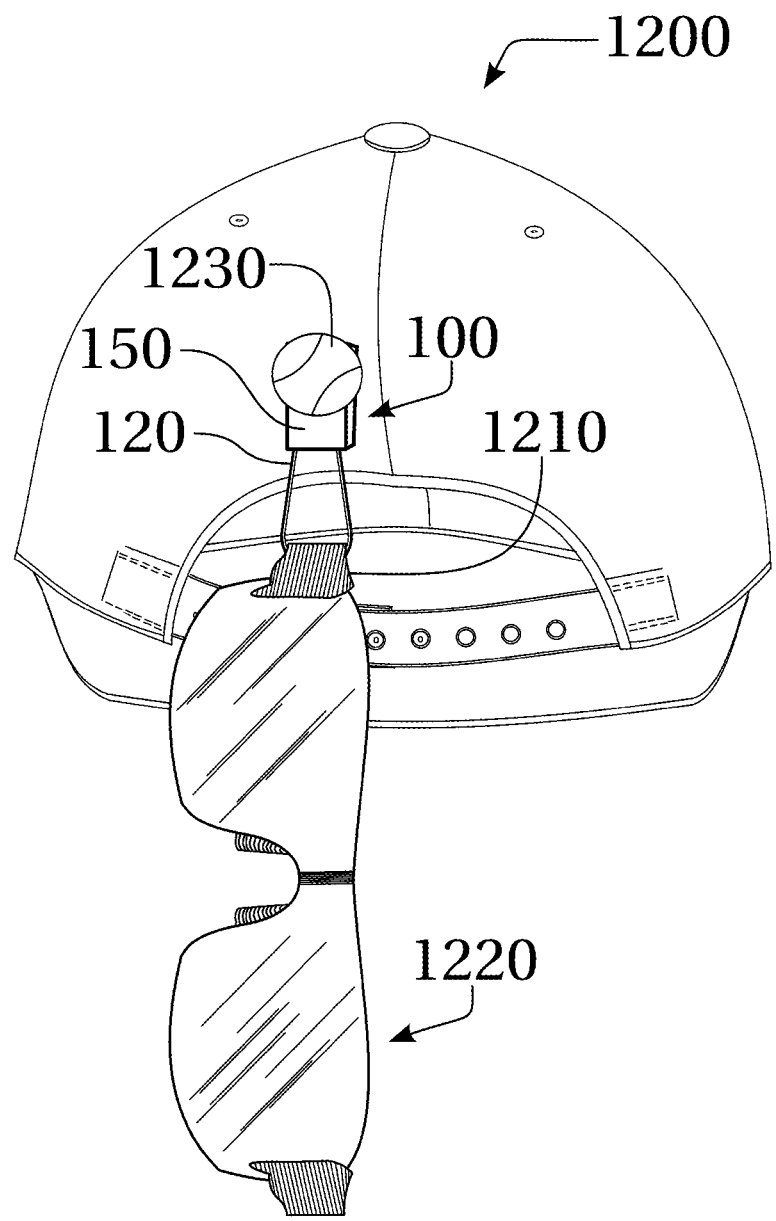
FIG. 12 is a perspective view of the preferred embodiment, in-use, affixed to a cap and retaining eyewear comprising larger lug members.

FIG. 12 is a perspective view showing the back of a hat 1200, or baseball cap, with a pair of eyewear 1220 in the secured position with the eyewear lug 1210 secured to the wearable retainer 100 assembly via the retaining hoop 120. The ornamental pendant 1230 affixed to the wearable retainer 100 can be changed as easily as the location of the wearable retainer 100 itself. From the front of the shirt 900, to the sleeve (not labeled) or front of the jacket 1000, to the side of the purse 1100, or to the back of the cap 1200—the same wearable retainer 100 is capable of affixing to each.

Once the magnetic multipurpose wearable retainer 100 and retainer retaining base 1300 are brought into magnetic attractive communication with each other and mated together, as shown in FIG. 13, the magnetic attractive forces between said wearable retainer 100 and retainer retaining base 1300 hold them releasably securely together. The combination of said magnetic multipurpose wearable retainer 100 and said retainer retaining base 1300, form a preferred embodiment of a magnetic securing device assembly.

Figure 14:
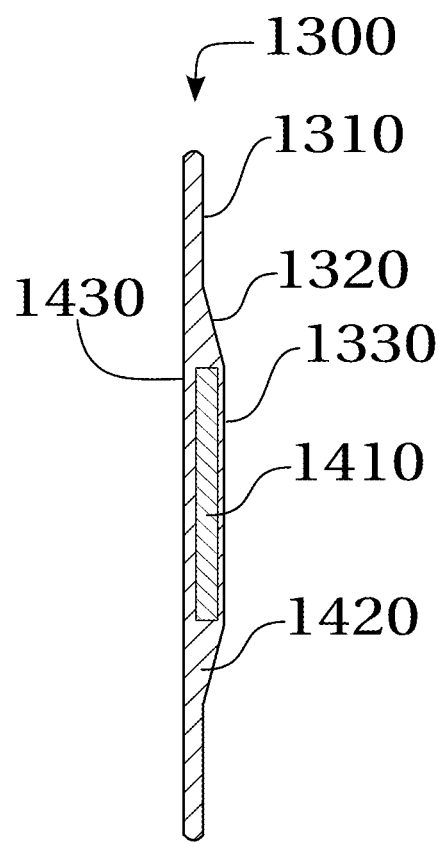
FIG. 14 is a cross-sectional orthogonal view, taken along line 14-14 of FIG. 13 (excluding said wearable retainer attached thereto), showing the wearable retainer retaining base and magnetic or ferrous material disposed therein.

FIG. 14 is a cross-sectional view of the form shown in FIG. 13 along line 14-14. The multipurpose wearable retainer retaining base 1300 of the preferred wearable retainer embodiment 100, includes a front side first planar section 1330 in the form of a circle and a lower second planar section 1310, in the form of a ring, encircling said first planar section. The first planer section 1330 is centered within the second planar section 1310. A rare earth magnet 1410 is positioned between the first planar section 1330 and the back side 1430 of said retainer retaining base 1300. The north magnetic pole (not labeled) of said rare earth magnet 1410 is oriented towards said first planar section 1330 of said wearable retainer retaining base 1300, thereby causing the back side 320 of said wearable retainer 100 to be in attractive magnetic communication with said first planar section 1330 of said retainer retaining base 1300.

Said first 1330 and second planar sections 1310 are separated by a sloped ring section 1320, wherein the length of the slope from said first planar section 1330 to said second planar section 1310 is at least the distance between the retainer retaining base front side 1330 and back side 1430. The slope 1320 between said planar sections reduces the visibility of the wearable retainer retaining base 1300 beneath articles of clothing by gradually reducing the thickness between the front side 1330 and back side 1430 of said retainer retaining base 1300 as the outer edge (not labeled) is approached as depicted in FIG. 14.

The retainer retaining base 1300 is preferably formed of resilient material that is sufficiently stiff, thereby providing resilient vertical and horizontal support when attached to clothing 900 upon engagement of eyewear 125 to the retaining hoop member 120. Said resilient materials generally include those comprised of plastic and rubber. The weight of the items retained by the retaining hoop 120 is distributed about the retaining base back side 1430 and front second planar section 1310. Because of the raised first planner section 1330, the outline of the retainer retaining base 1300 when in-use under clothing is less noticeable due to the circular shaped sloping section 1320.

The circular shape of the retainer retaining base back 1430 combined with it having a larger area than the raised first planar section 1330, causes loads 1030 suspended from the retaining hoop 120 member to be stabilized in all directions when in motion and mitigates stretching, pulling, and deformation of clothing articles 1000 in all directions. The frictional properties of the material 1420 comprising the retainer retaining base 1300 is sufficient to prevent the wearable retainer 100 from sliding about a shirt 900, jacket 1000, or other articles to which it is attached.

A unique aspect of the wearable retainer retaining base 1300 is that the load retained by the retaining hoop 120 is distributed about the lower retainer retaining base back 1340 portion and the upper portion of the second planer surface 1310 on the front. The shape of the retainer retaining base 1300 distributes a portion of the load about the surface contacting (not shown) the bottom back side 1430 of said retainer retaining base 1300. Additionally, another portion of the load is distributed about the top of the second planar surface 1310 about the material to which it is attached (not shown). The same load bearing distributing characteristics apply to left and right sides (not labeled) of said retainer retaining base 1300.

By attaching the wearable retainer 100 to the center of said retainer retaining base 1300 having a broad, gradually thinning, edge minimizing, circular load distributing foundation (not labeled), said retainer retaining base 1300 is less visible to observers and provides a stable foundation thereby reducing noticeable fabric surface disruptions thereabout the multipurpose wearable retainer 100 while the user is in motion. Additionally, said retainer retaining base 1300 member edges (not labeled) between the back side 1430 and front second planar section 1310 are rounded, thereby further reducing visible edges when in-use beneath said clothing.

The small wearable retainer retaining base 1500, illustrated in FIG. 15, is suitable for mounting the wearable retainer 100 to items made of rigid materials, such as a purse 1100 or backpack (not shown). Said small retainer retaining base 1500 is also suitable where the available area for mounting the retainer retaining base 1300 is limited, such as a baseball cap 1200 or swimwear (not shown).

Figure 16:
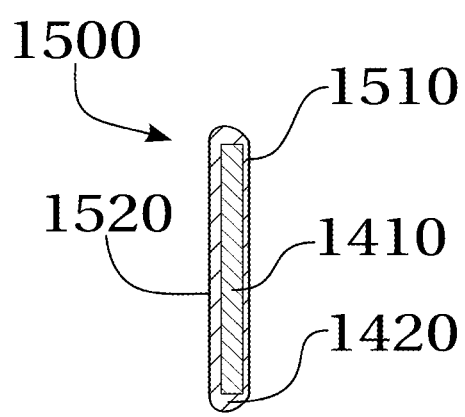
FIG. 16 is a cross-sectional orthogonal view, taken along line 16-16 of FIG. 15 (excluding said wearable retainer attached thereto), showing the small wearable retainer retaining base and magnetic or ferrous material disposed therein.

FIG. 16 is a cross-sectional view of the small multipurpose wearable retainer retaining base 1500 shown in FIG. 15 along line 16-16, illustrating the composition of said small retainer retaining base 1500. The front side outer edge (not labeled) of said small retainer retaining base 1500 is rounded to reduce the imprint when worn under garments made of thin material such as swimwear (not shown), and the back side outer edge (not labeled) is rounded to prevent abrasions against the surface it abuts. The magnet 1410 therein the small retainer retaining base 1500 is made of rare earth magnetic material.

Figure 17:
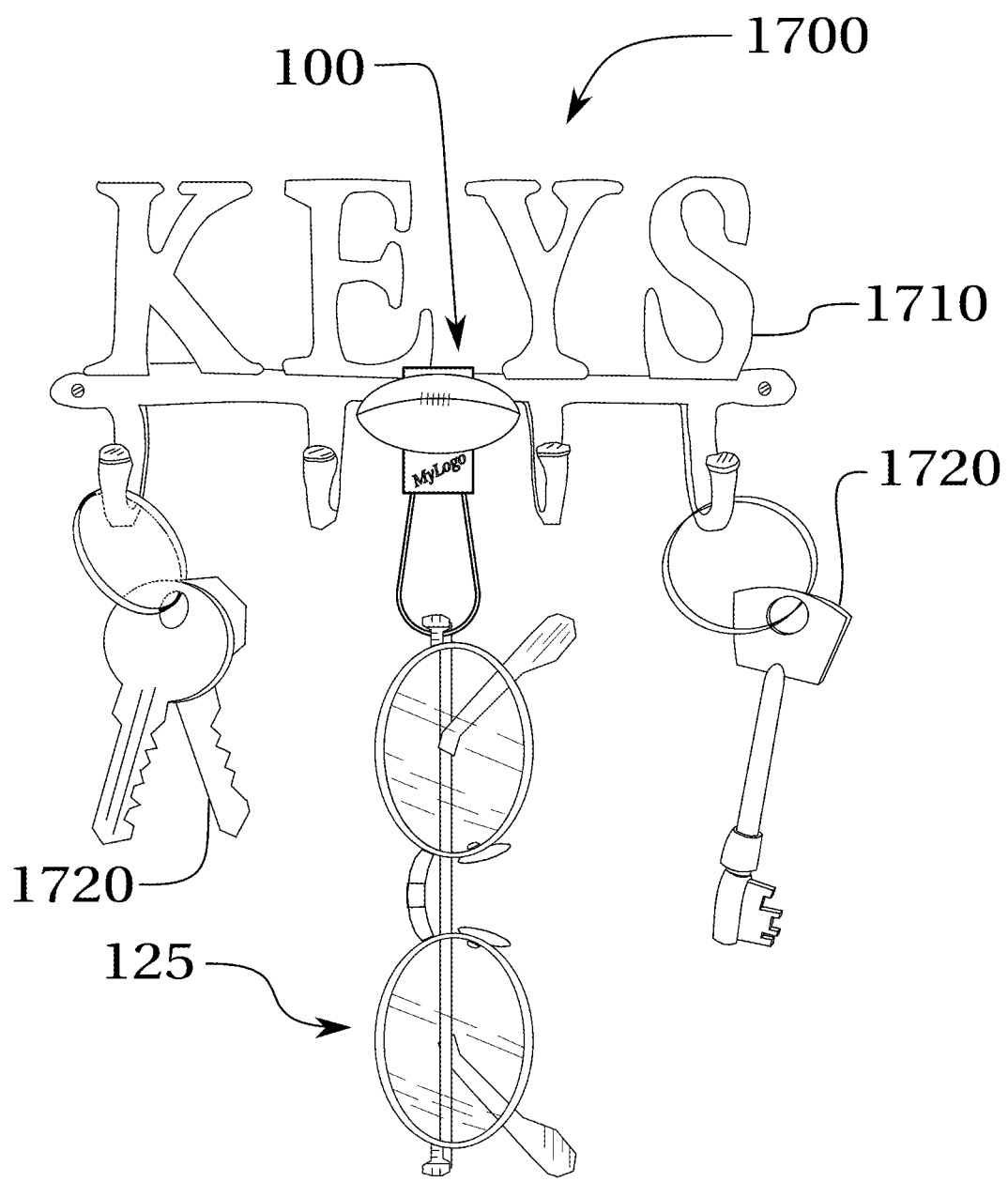
FIG. 17 is front view of the preferred embodiment, when in-use affixed to a ferrous metal key retention systems.

In-use, as shown in FIG. 17, a pair of eyeglasses 125 are retained by the magnetic multipurpose wearable retainer 100 attached to a ferrous metal key ring retaining system 1710, thereby demonstrating the versatility of said disclosed multipurpose wearable retainer 100 by retaining eyewear while attached to non-wearable items. Some items comprised of ferrous metals that may be desirable for attachment may include a gym locker door, towel rack, lamp stand, beach umbrella pole, or even a door knob or handle so as to not forget the eyewear 125 when exiting through said door.

The preferred embodiment of the magnetic multipurpose wearable retainer 100 and magnetic multipurpose wearable retainer retaining base 1300, are both comprised of rare earth magnets providing advantages over embodiments wherein the retainer retaining base 1300 magnetically attractive material 1410 is comprised of ferromagnetic material. This allows said wearable retainer 100 and said wearable retainer retaining base 1300 to be attached to non-ferrous non-wearable items where an appropriate substrate is available such as a curtain, beach umbrella, or pillow case (none shown).

Additionally, the wearable retainer preferred embodiment back side 320 and the wearable retainer retaining base front side 1330 are configured having opposite rare earth magnetic poles therein (not labeled), causing said sides to be in attractive magnetic communication when brought into close proximity with each other. The specific orientation of magnetic polarities ensures the advantageous retainer retaining base 1300 front side is always oriented in the desired direction, thereby enabling the retainer retaining base 1300 advantages therein when in-use.

Said advantages include being able to direct a specific predetermined side of said retainer retaining base 1300, having advantageous characteristics therein for attachment, towards the back side of the magnetic multipurpose wearable retainer 100. Such advantageous characteristics include the previously disclosed characteristics of said wearable retainer retaining base 1300 wherein the visible sagging, pulling, and twisting of the garment (not shown) are mitigated. Another unique advantage is being able to position the magnetic material 1430 within the retainer retaining base 1300 closer to the side attracted to said multipurpose wearable retainer 100, resulting in less material between the magnets impeding the retention abilities. The disclosed characteristics of said wearable retainer retaining base 1300 make it less visible through garments when the front side of said retainer retaining base 1300, the side having the advantages, is oriented towards the back side of said wearable retainer 100.

To make use of this device, the magnetic multipurpose wearable retainer 100 is adapted to attract the magnetic wearable retainer retaining base 1300 through a portion of the user's clothing, whereby the retainer retaining base is positioned inside the user's clothing and the wearable retainer is brought into close proximity, with the portion of clothing sandwiched therebetween, causing the operative combination of said wearable retainer 100 and said wearable retainer retaining base 1300 to magnetically secure said wearable retainer 100 to the user's clothing by the clamping or gripping magnetic force imparted thereon. Items to be retained can be attached to the wearable retainer retaining hoop 120 prior to or after attachment to clothing.

For retaining eyewear specifically, starting with the eyewear 125 in a folded-closed configuration, an ear piece 135 of the eyewear 125 is opened enough to be inserted through the aperture of the retaining hoop 120 that extends from the bottom 210 of said wearable retainer 100, and the associated ear piece 135 temple bar 130 is slid downward through said retaining hoop 120 aperture until reaching the lug 140 of the associated ear piece 135 of the eyewear 125. The retaining hoop 120, constructed from a length of commonly available nylon coated fishing wire, is configured to retain the eyewear 125 in a folded-closed configuration suspended by the lug 140 in a balanced pendulous hanging manner.

The eyewear 125 retained by the multipurpose wearable retainer 100 requires no modifications to be securely retained, and articles of clothing 900 and accessories 1100 to which the wearable retainer 100 is releasably secured, requires no modifications for the attachment of said wearable retainer 100.

The user releasably secures the nail bearing ornamental pendant 110 type indicia to the magnetic multipurpose wearable retainer 100 by aligning the point (not labeled) of the ornamental pendant nail 315 with the ornamental pendant nail aperture 240 of said magnetic multipurpose wearable retainer 100, and then inserting said pendant nail 315 into said ornamental pedant nail aperture 240 until the back of said ornamental pendant is flush and parallel with the front side of said magnetic multipurpose wearable retainer 100 or the spur 325 of said nail bearing ornamental pendant 110 type indicia abuts against the front side of said multipurpose wearable retainer 100.

When the wearer desires to remove the magnetic multipurpose wearable retainer 100 from attractive magnetic communication with the wearable retainer retaining base 1300, the wearer applies a force sufficient to break the attractive magnetic communication between said wearable retainer magnet 330 and said wearable retainer retaining base magnet 1410, while moving the wearable retainer 100 away from said retainer retaining base 1300 after said attractive magnetic communication is broken.

Specifically, the wearer removes said wearable retainer 100 by pressing on the material beside the wearable retainer 100, and thus applying pressure to the wearable retainer retaining base 1300 beneath said material, thereby imparting pressure on or about the lower second planar section 1310 of said retainer retaining base 1300, while simultaneously grasping the sides and pulling said wearable retainer 100 in the direction away from said retainer retaining base 1300 being held in place by said wearer applied pressure. By using the lower second planar section 1310 of said wearable retainer retaining base 1300 for leverage, breaking the magnetic coupling therebetween is accomplished with less effort than without said retainer retaining base leveraging means.

The disclosed device provides many advancements in the crowded eyewear retainer art. One such advantage is the ability to releasably secure a hatpin to the eyewear retaining device 100, thereby allowing users to adapt the visual appearance of said eyewear retainer 100 to ones attire or specific occasion at hand. Additionally, having an area suitable for affixing permanent logo type markings and indicia 150 in combination with users being able to releasably retain common off the shelf hatpins and the like thereto, make said wearable retainer 100 a versatile dual advertising medium. Similarly, having the ability to retain nail type indicia, in combination with one or more user selected accessories, such as eyewear, make this a versatile multipurpose wearable retainer 100.

The use of a length of fishing wire to form a retaining hoop 120 is advantageous in that eyewear comprised of larger lugs 1210, may be hooked on the retainer retaining hoop 120 just as easily as those comprised of smaller lugs 140, such as reading glasses 125. This is significant as prior art fails at properly retaining newer styles of eyewear having up to three-quarters of an inch lugs and a third of an inch temple bar thickness. The teardrop shaped fishing wire retainer retaining hoop 120 of the preferred embodiment 100, securely retains eyewear including the newer styles comprised of said larger lugs 1210.

The unique teardrop shaped retaining hoop 120 in combination with the properties of the fishing wire, allows for movements of the eyewear with said retaining hoop during use, instead of sliding along a non-flexible retaining means or twisting the fabric. Allowing such movements further prevents pulling and stretching of clothing to which the wearable retainer 100 is attached.

In addition, the aforementioned teardrop characteristics provide better securement means than prior art when the wearer is not in an upright vertical position. For example, if the user bends over, said teardrop shaped retaining hoop 120 in combination with the aforementioned properties of said fishing wire, keeps the eyewear secure by said retaining hoop 120 flexibly bending and turning, thereby allowing said eyewear lug 140 to rotate about said fishing wire, keeping said eyewear lug 140 above said retaining hoop 120.

The unique shape of the multipurpose wearable retainer retaining base 1300 provides means for substantially unnoticeable attachment beneath clothing. Using rare earth magnets in both the wearable retainer 100 and retainer retaining base 1300, while not necessarily non-obvious in and of itself, provides the necessary means for secure attachment to thicker types of items such as a jacket 1000 or purse 1100. However, orienting the polarities of the the wearable retainer magnet 330 and retainer retaining base magnet 1410 such that specific sides with advantageous characteristics when in-use in attractive magnetic communication, is believed to be yet another less than obvious discovery disclosed.

Yet another advantage, is the eyewear or items being retained by the retaining hoop 120, do not need to be removed from the magnetic multipurpose wearable retainer 100 when said wearable retainer 100 is removed from clothing. The securement of eyewear is not dependent on the wearable retainer 100 being abutted to the wearable retainer retaining base 1300. That is, the retention abilities are not dependent on the state of use, since the retaining hoop 120 retention abilities are always present even when not attached to clothing or accessories.

Finally, the eyewear and item to which the magnetic multipurpose wearable retainer 100 is attached, does not need physical modifications for using said wearable retainer 100, such as attaching retaining means to the eyewear or puncturing the item to which the wearable retainer is to be attached.

No known disclosure is presently available that is capable, nor has the required structure, to retain a nail type indicia and a plurality of accessories including eyewear as disclosed herein. Additionally, no eyewear retaining product currently exists on the market today allowing the wearer to change the appearance with commonly available nail type indicia such as a hat pin.

While certain novel features of this disclosure have been described and illustrated herein as embodied in a specific construction of a magnetic multipurpose wearable retainer designed to secure an ornamental pendant to be displayed as well as supporting a pair of eyeglasses while not being used, it is not limited to the details of this particular construction, since it is understood that various omissions, modifications, substitutions and changes in the forms and details of the device illustrated and in its operation can be made by those skilled in the art without departing in any way from the spirit of the present disclosure.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure.

What is claimed is new and desired to be protected by Letters Patent is set forth in the appended claims:

1. A retaining apparatus comprising:
  a vertically extending wearable retainer (100) comprising:
    a retainer substrate;
    a first magnet (330) fixedly coupled relative to the retainer substrate;
    a clutch cavity (310) disposed vertically above the magnet (330) and disposed in the retainer substrate; and,
    a nail aperture (240) disposed at a front surface of the wearable retainer and passing through the retainer substrate, the nail aperture (240) being configured to receive a nail (315) of an indicia pin (110) into the clutch cavity (310);
  a retaining hoop (120) fixedly coupled at a bottom surface (210) of the wearable retainer (100), wherein the first magnet (330) is vertically disposed between the clutch cavity (310) and the retaining hoop (210);
  a retainer retaining base (1300) comprising a second magnet (1410) configured to magnetically couple with the first magnet (330), such that when magnetically and operably coupled, a back side (320) of the wearable retainer (100) is in intimate physical contact with the front side (1330) of the retainer retaining base (1300);
  the indicia pin (110) comprising:
    an ornamental portion; and, the nail (315) fixedly coupled to the ornamental portion, the nail (315) being configured to be received in the clutch cavity (310) via the nail aperture (240); and, a pendant clutch (305) sized to fit within clutch cavity (310) and configured to receive the nail (315), wherein, when the pendant clutch (305), the nail (315), and the nail aperture (240) are operatively aligned and assembled with one another:

the indicia pin (110) is securely retained by the wearable retainer (100) via frictional engagement, inside of the clutch cavity (310), between the nail (315) and the pendant clutch (305), and, the nail aperture (240) is disposed between the ornamental portion and the pendant clutch (305).

* * * * *